(12) United States Patent
Salsich et al.

(10) Patent No.: US 11,127,313 B2
(45) Date of Patent: *Sep. 21, 2021

(54) SYSTEMS AND METHODS FOR A WELD TRAINING SYSTEM

(71) Applicant: ILLINOIS TOOL WORKS INC., Glenview, IL (US)

(72) Inventors: Anthony Van Bergen Salsich, Appleton, WI (US); William Joshua Becker, Manitowoc, WI (US); Bruce Patrick Albrecht, Neenah, WI (US)

(73) Assignee: Illinois Tool Works Inc., Glenview, IL (US)

( * ) Notice: Subject to any disclaimer, the term of this patent is extended or adjusted under 35 U.S.C. 154(b) by 334 days.

This patent is subject to a terminal disclaimer.

(21) Appl. No.: 16/101,874

(22) Filed: Aug. 13, 2018

(65) Prior Publication Data
US 2019/0005846 A1 Jan. 3, 2019

Related U.S. Application Data

(63) Continuation of application No. 14/554,693, filed on Nov. 26, 2014, now Pat. No. 10,056,010.
(Continued)

(51) Int. Cl.
*G09B 19/24* (2006.01)
*B23K 9/095* (2006.01)
(Continued)

(52) U.S. Cl.
CPC ............ *G09B 19/24* (2013.01); *B23K 9/0953* (2013.01); *G09B 5/02* (2013.01); *G09B 9/00* (2013.01)

(58) Field of Classification Search
CPC .......... G09B 19/24; B23K 9/09; B23K 9/095; B23K 9/0953
See application file for complete search history.

(56) References Cited

U.S. PATENT DOCUMENTS 1,340,270 A 5/1920 Emil
2,045,800 A 6/1936 Walther
(Continued)

FOREIGN PATENT DOCUMENTS

CA 2311685 12/2001
CA 2517874 12/2001
(Continued)

OTHER PUBLICATIONS

Welding Accessories. Global Specs <retrieved: https://web.archive.org/web/20100809231402/https://www.globalspec.com/learnmore/manufacturing_process_equipment/welding_equipment_supplies/welding_accessories> (Year: 2010).*
(Continued)

*Primary Examiner* — Robert J Utama
(74) *Attorney, Agent, or Firm* — McAndrews, Held & Malloy, Ltd.

(57) ABSTRACT

Systems and methods for a weld training system are disclosed. An example weld training system includes: a mobile device configured to be attached to a welding accessory using a mount, the mobile device comprising one or more sensors, wherein the mobile device is configured to: gather, via the one or more sensors of the mobile device, information indicative of dynamic position or orientation of the mobile device during a welding procedure; and display, via a display of the mobile device, a welding environment based on the information.

22 Claims, 4 Drawing Sheets

Related U.S. Application Data

(60) Provisional application No. 61/911,321, filed on Dec. 3, 2013.

(51) Int. Cl.
*G09B 9/00* (2006.01)
*G09B 5/02* (2006.01)

(56) References Cited

U.S. PATENT DOCUMENTS

| | | |
|---|---|---|
| 2,045,801 A | 6/1936 | Richter |
| 2,045,802 A | 6/1936 | Walther |
| 2,333,192 A | 10/1942 | Moberg |
| 2,351,910 A | 6/1944 | Blankenbuehler |
| 3,391,691 A | 7/1968 | Young |
| 3,679,865 A | 7/1972 | Jesnitzer |
| 3,867,769 A | 2/1975 | Schow |
| 4,028,522 A | 6/1977 | Chihoski |
| 4,041,615 A | 8/1977 | Whitehill |
| 4,044,377 A | 8/1977 | Bowerman |
| 4,124,944 A | 11/1978 | Blair |
| 4,132,014 A | 1/1979 | Schow |
| 4,144,766 A | 3/1979 | Wehrmeister |
| 4,224,501 A | 9/1980 | Lindbom |
| 4,253,648 A | 3/1981 | Meeks |
| 4,294,440 A | 10/1981 | Severt |
| 4,375,026 A | 2/1983 | Kearney |
| 4,375,165 A | 3/1983 | deSterke |
| 4,389,561 A | 6/1983 | Weman |
| 4,396,945 A | 8/1983 | DiMatteo |
| 4,412,121 A | 10/1983 | Kremers |
| 4,452,589 A | 6/1984 | Denison |
| 4,459,114 A | 7/1984 | Barwick |
| 4,471,207 A | 9/1984 | Hawkes |
| 4,484,059 A | 11/1984 | Lillquist |
| 4,485,683 A | 12/1984 | Bertil |
| 4,518,361 A | 5/1985 | Conway |
| 4,541,055 A | 9/1985 | Wolfe |
| 4,555,614 A | 11/1985 | Morris |
| 4,557,191 A | 12/1985 | Speicher |
| 4,577,499 A | 3/1986 | Silke |
| 4,590,356 A | 5/1986 | Povlick |
| 4,591,689 A | 5/1986 | Brown |
| 4,594,497 A | 6/1986 | Takahashi |
| 4,595,186 A | 6/1986 | Reed |
| 4,595,368 A | 6/1986 | Cole |
| 4,595,820 A | 6/1986 | Richardson |
| 4,609,806 A | 9/1986 | Grabkowski |
| 4,628,176 A | 12/1986 | Kojima |
| 4,638,146 A | 1/1987 | Koyama |
| 4,641,292 A | 2/1987 | Tunnell |
| 4,677,277 A | 6/1987 | Cook |
| 4,680,014 A | 7/1987 | Paton |
| 4,689,021 A | 8/1987 | Vasiliev |
| 4,716,273 A | 12/1987 | Paton |
| 4,721,947 A | 1/1988 | Brown |
| 4,728,768 A | 3/1988 | Cueman |
| 4,739,404 A | 4/1988 | Richardson |
| 4,767,109 A | 8/1988 | Raketich |
| 4,820,901 A | 4/1989 | Peviani |
| 4,829,365 A | 5/1989 | Eichenlaub |
| 4,830,261 A | 5/1989 | Mello |
| 4,867,685 A | 9/1989 | Brush |
| 4,868,649 A | 9/1989 | Gaudin |
| 4,877,940 A | 10/1989 | Bangs |
| 4,881,678 A | 11/1989 | Gaudin |
| 4,920,249 A | 4/1990 | McLaughlin |
| 4,931,018 A | 6/1990 | Herbst |
| 4,937,427 A | 6/1990 | McVicker |
| 4,943,702 A | 7/1990 | Richardson |
| 4,954,690 A | 9/1990 | Kensrue |
| 4,992,881 A | 2/1991 | Tomasek |
| 4,996,409 A | 2/1991 | Paton |
| 5,061,841 A | 10/1991 | Richardson |
| 5,103,376 A | 4/1992 | Blonder |
| 5,185,561 A | 2/1993 | Good |
| 5,208,436 A | 5/1993 | Blankenship |
| 5,211,564 A | 8/1993 | Martinez |
| 5,231,928 A | 8/1993 | Phillips |
| 5,243,265 A | 9/1993 | Matsuura |
| 5,281,921 A | 1/1994 | Novak |
| 5,283,418 A | 2/1994 | Bellows |
| 5,302,799 A | 4/1994 | Kennedy |
| 5,304,774 A | 4/1994 | Durheim |
| 5,306,893 A | 4/1994 | Morris |
| 5,320,538 A | 6/1994 | Baum |
| 5,343,011 A | 8/1994 | Fujii |
| 5,380,978 A | 1/1995 | Pryor |
| 5,397,872 A | 3/1995 | Baker |
| 5,404,181 A | 4/1995 | Hung |
| 5,426,732 A | 6/1995 | Boies |
| 5,430,643 A | 7/1995 | Seraji |
| 5,448,405 A | 9/1995 | Clausen |
| 5,464,957 A | 11/1995 | Kidwell |
| 5,508,757 A | 4/1996 | Chen |
| 5,514,846 A | 5/1996 | Cecil |
| 5,517,420 A | 5/1996 | Kinsman |
| 5,521,843 A | 5/1996 | Hashima |
| 5,533,146 A | 7/1996 | Iwai |
| 5,543,863 A | 8/1996 | Lin |
| 5,546,476 A | 8/1996 | Mitaka |
| 5,571,431 A | 11/1996 | Lantieri |
| 5,592,241 A | 1/1997 | Kita |
| 5,617,335 A | 4/1997 | Hashima |
| 5,626,672 A | 5/1997 | Rossetti |
| 5,659,479 A | 8/1997 | Duley |
| 5,668,612 A | 9/1997 | Hung |
| 5,674,415 A | 10/1997 | Leong |
| 5,675,229 A | 10/1997 | Thorne |
| 5,681,490 A | 10/1997 | Chang |
| 5,708,253 A | 1/1998 | Bloch |
| 5,709,219 A | 1/1998 | Chen |
| 5,747,042 A | 5/1998 | Choquet |
| 5,823,785 A | 10/1998 | Matherne, Jr. |
| 5,832,139 A | 11/1998 | Batterman |
| 5,845,053 A | 12/1998 | Watanabe |
| 5,856,844 A | 1/1999 | Batterman |
| 5,930,093 A | 7/1999 | Morrissett |
| 5,961,859 A | 10/1999 | Chou |
| 5,973,677 A | 10/1999 | Gibbons |
| 5,999,909 A | 12/1999 | Rakshit |
| 6,003,052 A | 12/1999 | Yamagata |
| 6,018,729 A | 1/2000 | Zacharia |
| 6,019,359 A | 2/2000 | Fly |
| 6,024,273 A | 2/2000 | Ludewig |
| 6,033,226 A | 3/2000 | Bullen |
| 6,039,494 A | 3/2000 | Pearce |
| 6,046,431 A | 4/2000 | Beattie |
| 6,046,754 A | 4/2000 | Stanek |
| 6,049,059 A | 4/2000 | Kim |
| 6,051,805 A | 4/2000 | Vaidya |
| 6,101,455 A | 8/2000 | Davis |
| 6,107,601 A | 8/2000 | Shimagama |
| 6,115,025 A | 9/2000 | Buxton |
| 6,130,407 A | 10/2000 | Villafuerte |
| 6,136,946 A | 10/2000 | Yao |
| 6,153,848 A | 11/2000 | Nagae |
| 6,155,475 A | 12/2000 | Ekelof |
| 6,163,946 A | 12/2000 | Pryor |
| 6,226,395 B1 | 5/2001 | Gilliland |
| 6,236,017 B1 | 5/2001 | Smartt |
| 6,242,711 B1 | 6/2001 | Cooper |
| 6,271,500 B1 | 8/2001 | Hirayama |
| 6,288,359 B1 | 9/2001 | Koch |
| 6,290,740 B1 | 9/2001 | Schaefer |
| 6,301,763 B1 | 10/2001 | Pryor |
| 6,315,186 B1 | 11/2001 | Friedl |
| 6,329,635 B1 | 12/2001 | Leong |
| 6,337,458 B1 | 1/2002 | Lepeltier |
| 6,371,765 B1 | 4/2002 | Wall |
| 6,417,894 B1 | 7/2002 | Goff |
| 6,441,342 B1 | 8/2002 | Hsu |
| 6,445,964 B1 | 9/2002 | White |
| 6,469,752 B1 | 10/2002 | Ishikawa |

(56) References Cited

U.S. PATENT DOCUMENTS

| | | |
|---|---|---|
| 6,476,354 B1 | 11/2002 | Jank |
| 6,479,793 B1 | 11/2002 | Wittmann |
| 6,506,997 B2 | 1/2003 | Matsuyama |
| 6,516,300 B1 | 2/2003 | Rakshit |
| 6,572,379 B1 | 6/2003 | Sears |
| 6,583,386 B1 | 6/2003 | Ivkovich |
| 6,596,972 B1 | 7/2003 | Di Novo |
| 6,614,002 B2 | 9/2003 | Weber |
| 6,621,049 B2 | 9/2003 | Suzuki |
| 6,622,906 B1 | 9/2003 | Kushibe |
| 6,647,288 B2 | 11/2003 | Madill |
| 6,670,574 B1 | 12/2003 | Bates |
| 6,697,761 B2 | 2/2004 | Akatsuka |
| 6,703,585 B2 | 3/2004 | Suzuki |
| 6,710,298 B2 | 3/2004 | Eriksson |
| 6,728,582 B1 | 4/2004 | Wallack |
| 6,734,393 B1 | 5/2004 | Friedl |
| 6,744,011 B1 | 6/2004 | Hu |
| 6,748,249 B1 | 6/2004 | Eromaki |
| 6,750,428 B2 | 6/2004 | Okamoto |
| 6,753,909 B1 | 6/2004 | Westerman |
| 6,768,974 B1 | 7/2004 | Nanjundan |
| 6,795,068 B1 | 9/2004 | Marks |
| 6,839,049 B1 | 1/2005 | Koizumi |
| 6,857,553 B1 | 2/2005 | Hartman |
| 6,868,726 B2 | 3/2005 | Lemkin |
| 6,910,971 B2 | 6/2005 | Alsenz |
| 6,927,360 B2 | 8/2005 | Artelsmair |
| 6,937,329 B2 | 8/2005 | Esmiller |
| 6,967,635 B2 | 11/2005 | Hung |
| 6,977,357 B2 | 12/2005 | Hsu |
| 6,995,536 B2 | 2/2006 | Challoner |
| 7,015,419 B2 | 3/2006 | Hackl |
| 7,025,053 B1 | 4/2006 | Altamirano |
| 7,032,814 B2 | 4/2006 | Blankenship |
| 7,045,742 B2 | 5/2006 | Feichtinger |
| 7,081,888 B2 | 7/2006 | Cok |
| 7,120,473 B1 | 10/2006 | Hawkins |
| 7,132,617 B2 | 11/2006 | Lee |
| 7,132,623 B2 | 11/2006 | DeMiranda |
| 7,150,047 B2 | 12/2006 | Fergason |
| 7,173,215 B1 | 2/2007 | Kapoor |
| 7,181,413 B2 | 2/2007 | Hadden |
| 7,226,176 B1 | 6/2007 | Huang |
| 7,261,261 B2 | 8/2007 | Ligertwood |
| 7,342,210 B2 | 3/2008 | Fergason |
| 7,358,458 B2 | 4/2008 | Daniel |
| 7,465,230 B2 | 12/2008 | LeMay |
| 7,474,760 B2 | 1/2009 | Hertzman |
| 7,523,069 B1 | 4/2009 | Friedl |
| 7,564,005 B2 | 7/2009 | Cabanaw |
| 7,574,172 B2 | 8/2009 | Clark |
| 7,577,285 B2 | 8/2009 | Schwarz |
| D614,217 S | 4/2010 | Peters |
| 7,698,094 B2 | 4/2010 | Aratani |
| D615,573 S | 5/2010 | Peters |
| 7,766,213 B2 | 8/2010 | Henrikson |
| 7,789,811 B2 | 9/2010 | Cooper |
| 7,813,830 B2 | 10/2010 | Summers |
| 7,826,984 B2 | 11/2010 | Sjostrand |
| 7,831,098 B2 | 11/2010 | Melikian |
| 7,839,416 B2 | 11/2010 | Ebensberger |
| 7,845,560 B2 | 12/2010 | Emanuel |
| D631,074 S | 1/2011 | Peters |
| 7,899,618 B2 | 3/2011 | Ledet |
| 7,962,967 B2 | 6/2011 | Becker |
| 8,019,144 B2 | 9/2011 | Sugihara |
| 8,044,942 B1 | 10/2011 | Leonhard |
| 8,046,178 B2 | 10/2011 | Dai |
| 8,100,694 B2 | 1/2012 | Portoghese |
| 8,110,774 B2 | 2/2012 | Huonker |
| 8,235,588 B2 | 8/2012 | Louban |
| 8,248,324 B2 | 8/2012 | Nangle |
| 8,274,013 B2 | 9/2012 | Wallace |
| 8,393,519 B2 | 3/2013 | Allehaux |
| 8,406,682 B2 | 3/2013 | Elesseily |
| 8,431,862 B2 | 4/2013 | Kachline |
| 8,432,476 B2 | 4/2013 | Ashforth |
| 8,478,382 B2 | 7/2013 | Burnside |
| 8,502,866 B2 | 8/2013 | Becker |
| 8,512,043 B2 | 8/2013 | Choquet |
| 8,541,746 B2 | 9/2013 | Andres |
| 8,657,605 B2 | 2/2014 | Wallace |
| 8,681,178 B1 | 3/2014 | Tseng |
| 8,686,318 B2 | 4/2014 | Albrecht et al. |
| 8,692,157 B2 | 4/2014 | Daniel |
| 8,698,843 B2 | 4/2014 | Tseng |
| 8,747,116 B2 | 6/2014 | Zboray |
| 8,777,629 B2 | 7/2014 | Kreindl |
| 8,803,908 B2 | 8/2014 | Van Osten |
| 8,834,168 B2 | 9/2014 | Peters |
| 8,851,896 B2 | 10/2014 | Wallace |
| 8,860,760 B2 | 10/2014 | Chen |
| 8,911,237 B2 | 12/2014 | Postlethwaite |
| 8,915,740 B2 | 12/2014 | Zboray |
| 8,946,595 B2 | 2/2015 | Ishida |
| 8,953,033 B2 | 2/2015 | Yamane |
| 8,953,909 B2 | 2/2015 | Guckenberger |
| RE45,398 E | 3/2015 | Wallace |
| 8,987,628 B2 | 3/2015 | Daniel |
| 8,990,842 B2 | 3/2015 | Rowley |
| 8,992,226 B1 | 3/2015 | Leach |
| 9,011,154 B2 | 4/2015 | Kindig |
| 9,012,802 B2 | 4/2015 | Daniel |
| 9,050,678 B2 | 6/2015 | Daniel |
| 9,050,679 B2 | 6/2015 | Daniel |
| 9,089,921 B2 | 7/2015 | Daniel |
| 9,101,994 B2 | 8/2015 | Albrecht |
| 9,196,169 B2 | 11/2015 | Wallace |
| 9,218,745 B2 | 12/2015 | Choquet |
| 9,230,449 B2 | 1/2016 | Conrardy |
| 9,269,279 B2 | 2/2016 | Penrod |
| 9,293,056 B2 | 3/2016 | Zboray |
| 9,293,057 B2 | 3/2016 | Zboray |
| 9,318,026 B2 | 4/2016 | Peters |
| 9,330,575 B2 | 5/2016 | Peters |
| 9,336,686 B2 | 5/2016 | Peters |
| 9,402,122 B2 | 7/2016 | Richardson |
| 9,573,215 B2 | 2/2017 | Pfeifer |
| 9,685,099 B2 | 6/2017 | Boulware |
| 9,724,787 B2 | 8/2017 | Becker |
| 9,789,603 B2 | 10/2017 | Jacobsen |
| 10,427,239 B2 | 10/2019 | Becker |
| 2001/0026445 A1 | 10/2001 | Naghi |
| 2001/0032508 A1 | 10/2001 | Lemkin |
| 2002/0043607 A1 | 4/2002 | Tajima |
| 2002/0071550 A1 | 6/2002 | Pletikosa |
| 2002/0105797 A1 | 8/2002 | Navid |
| 2002/0114653 A1 | 8/2002 | Gatta |
| 2002/0148745 A1 | 10/2002 | Chang |
| 2002/0153354 A1 | 10/2002 | Norby |
| 2003/0011673 A1 | 1/2003 | Eriksson |
| 2003/0092496 A1 | 5/2003 | Alsenz |
| 2003/0172032 A1 | 9/2003 | Choquet |
| 2004/0058703 A1 | 3/2004 | Eromaki |
| 2004/0068335 A1 | 4/2004 | Ferla |
| 2004/0069754 A1 | 4/2004 | Bates |
| 2004/0099648 A1 | 5/2004 | Hu |
| 2004/0175684 A1 | 9/2004 | Kaasa |
| 2004/0223148 A1 | 11/2004 | Takemura |
| 2004/0227730 A1 | 11/2004 | Sugihara |
| 2004/0251910 A1 | 12/2004 | Smith |
| 2005/0006363 A1 | 1/2005 | Hsu |
| 2005/0012598 A1 | 1/2005 | Berquist |
| 2005/0016979 A1 | 1/2005 | Stein |
| 2005/0017152 A1 | 1/2005 | Fergason |
| 2005/0073506 A1 | 4/2005 | Durso |
| 2005/0127052 A1 | 6/2005 | Spencer |
| 2005/0133488 A1 | 6/2005 | Blankenship |
| 2005/0135682 A1 | 6/2005 | Abrams |
| 2005/0179654 A1 | 8/2005 | Hawkins |
| 2005/0197115 A1 | 9/2005 | Clark et al. |
| 2005/0207102 A1 | 9/2005 | Russo |
| 2005/0219206 A1 | 10/2005 | Schena |

(56) References Cited

U.S. PATENT DOCUMENTS

| | | |
|---|---|---|
| 2005/0227635 A1 | 10/2005 | Hawkins |
| 2005/0256611 A1 | 11/2005 | Pretlove |
| 2006/0010551 A1 | 1/2006 | Bishop |
| 2006/0081740 A1 | 4/2006 | Bellavance |
| 2006/0136183 A1 | 6/2006 | Choquet |
| 2006/0151446 A1 | 7/2006 | Schneider |
| 2006/0163228 A1 | 7/2006 | Daniel |
| 2006/0173619 A1 | 8/2006 | Brant |
| 2006/0212169 A1 | 9/2006 | Luthardt |
| 2006/0241432 A1 | 10/2006 | Herline |
| 2007/0038400 A1 | 2/2007 | Lee |
| 2007/0051711 A1 | 3/2007 | Kachline |
| 2007/0056942 A1 | 3/2007 | Daniel et al. |
| 2007/0114215 A1 | 5/2007 | Bill |
| 2007/0115202 A1 | 5/2007 | Kiesenhofer |
| 2007/0164006 A1 | 7/2007 | Burgstaller |
| 2007/0187378 A1 | 8/2007 | Karakas |
| 2007/0188606 A1 | 8/2007 | Atkinson |
| 2007/0209586 A1 | 9/2007 | Ebensberger |
| 2007/0221636 A1 | 9/2007 | Monzyk |
| 2007/0247793 A1 | 10/2007 | Carnevali |
| 2007/0248261 A1 | 10/2007 | Zhou |
| 2007/0264620 A1 | 11/2007 | Maddix |
| 2007/0278196 A1 | 12/2007 | James |
| 2007/0291166 A1 | 12/2007 | Misawa |
| 2008/0004633 A1 | 1/2008 | Arata |
| 2008/0030631 A1 | 2/2008 | Gallagher |
| 2008/0038702 A1 | 2/2008 | Choquet |
| 2008/0061113 A9 | 3/2008 | Seki |
| 2008/0077422 A1 | 3/2008 | Dooley |
| 2008/0124698 A1 | 5/2008 | Ebensberger |
| 2008/0128395 A1 | 6/2008 | Aigner |
| 2008/0128400 A1 | 6/2008 | Michels |
| 2008/0149602 A1 | 6/2008 | Lenzner |
| 2008/0149608 A1 | 6/2008 | Albrecht |
| 2008/0158502 A1 | 7/2008 | Becker |
| 2008/0168290 A1 | 7/2008 | Jobs |
| 2008/0169277 A1 | 7/2008 | Achtner |
| 2008/0234960 A1 | 9/2008 | Byington |
| 2008/0314887 A1 | 12/2008 | Stoger |
| 2009/0005728 A1 | 1/2009 | Weinert |
| 2009/0057285 A1 | 3/2009 | Bashore |
| 2009/0057286 A1 | 3/2009 | Ihara |
| 2009/0109128 A1 | 4/2009 | Nangle |
| 2009/0146359 A1 | 6/2009 | Canfield |
| 2009/0152251 A1 | 6/2009 | Dantinne |
| 2009/0161212 A1 | 6/2009 | Gough |
| 2009/0173726 A1 | 7/2009 | Davidson |
| 2009/0189974 A1 | 7/2009 | Deering |
| 2009/0190826 A1 | 7/2009 | Tate |
| 2009/0200281 A1 | 8/2009 | Hampton |
| 2009/0200282 A1 | 8/2009 | Hampton |
| 2009/0230107 A1 | 9/2009 | Ertmer |
| 2009/0231423 A1 | 9/2009 | Becker |
| 2009/0236325 A1 | 9/2009 | Gozalbo |
| 2009/0249606 A1 | 10/2009 | Diez |
| 2009/0283021 A1 | 11/2009 | Wong |
| 2009/0298024 A1 | 12/2009 | Batzler |
| 2009/0313549 A1 | 12/2009 | Casner et al. |
| 2009/0323121 A1 | 12/2009 | Valkenburg |
| 2010/0020483 A1 | 1/2010 | Ma |
| 2010/0048273 A1 | 2/2010 | Wallace |
| 2010/0062405 A1 | 3/2010 | Zboray |
| 2010/0062406 A1 | 3/2010 | Zboray |
| 2010/0088793 A1 | 4/2010 | Ghisleni |
| 2010/0123664 A1 | 5/2010 | Shin |
| 2010/0133247 A1 | 6/2010 | Mazumder |
| 2010/0145520 A1 | 6/2010 | Gerio |
| 2010/0167249 A1 | 7/2010 | Donncha |
| 2010/0201803 A1 | 8/2010 | Melikian |
| 2010/0207620 A1 | 8/2010 | Gies |
| 2010/0224610 A1 | 9/2010 | Wallace |
| 2010/0238119 A1 | 9/2010 | Dubrovsky |
| 2010/0245273 A1 | 9/2010 | Hwang |
| 2010/0283588 A1 | 11/2010 | Gomez |
| 2010/0291313 A1 | 11/2010 | Ling |
| 2010/0314362 A1 | 12/2010 | Albrecht |
| 2011/0000892 A1 | 1/2011 | Mueller |
| 2011/0006047 A1 | 1/2011 | Penrod |
| 2011/0091846 A1 | 4/2011 | Kreindl |
| 2011/0092828 A1 | 4/2011 | Spohn |
| 2011/0114615 A1 | 5/2011 | Daniel |
| 2011/0117527 A1 | 5/2011 | Conrardy |
| 2011/0176720 A1 | 7/2011 | VanOsten |
| 2011/0183304 A1 | 7/2011 | Wallace |
| 2011/0198329 A1 | 8/2011 | Davidson |
| 2011/0220616 A1 | 9/2011 | Mehn |
| 2011/0220619 A1 | 9/2011 | Mehn |
| 2011/0240605 A1 | 10/2011 | Takayama |
| 2011/0249090 A1 | 10/2011 | Moore |
| 2011/0284508 A1 | 11/2011 | Miura |
| 2011/0285290 A1 | 11/2011 | Griffin |
| 2011/0286005 A1 | 11/2011 | Yamamoto |
| 2011/0290765 A1 | 12/2011 | Albrecht |
| 2011/0311297 A1 | 12/2011 | Giuliano |
| 2011/0313731 A1 | 12/2011 | Vock |
| 2012/0007748 A1 | 1/2012 | Forgues |
| 2012/0037600 A1 | 2/2012 | Katoh |
| 2012/0048838 A1 | 3/2012 | Ishida |
| 2012/0072021 A1 | 3/2012 | Walser |
| 2012/0077174 A1 | 3/2012 | DePaul |
| 2012/0105476 A1 | 5/2012 | Tseng |
| 2012/0113512 A1 | 5/2012 | Tsanev |
| 2012/0122062 A1 | 5/2012 | Yang |
| 2012/0175834 A1 | 7/2012 | Hamm |
| 2012/0180180 A1 | 7/2012 | Steve |
| 2012/0188365 A1 | 7/2012 | Stork |
| 2012/0189993 A1 | 7/2012 | Kindig |
| 2012/0205359 A1 | 8/2012 | Daniel |
| 2012/0231894 A1 | 9/2012 | Nicora |
| 2012/0248080 A1 | 10/2012 | Hutchison |
| 2012/0248083 A1 | 10/2012 | Garvey |
| 2012/0291172 A1 | 11/2012 | Wills |
| 2012/0298640 A1 | 11/2012 | Conrardy |
| 2012/0323496 A1 | 12/2012 | Burroughs |
| 2013/0040270 A1 | 2/2013 | Albrecht |
| 2013/0064427 A1 | 3/2013 | Picard et al. |
| 2013/0081293 A1 | 4/2013 | Delin |
| 2013/0119037 A1 | 5/2013 | Daniel |
| 2013/0178952 A1 | 7/2013 | Wersborg |
| 2013/0182070 A1 | 7/2013 | Peters |
| 2013/0183645 A1 | 7/2013 | Wallace |
| 2013/0189656 A1 | 7/2013 | Zboray |
| 2013/0189657 A1 | 7/2013 | Wallace |
| 2013/0189658 A1 | 7/2013 | Peters |
| 2013/0200882 A1 | 8/2013 | Almalki |
| 2013/0203029 A1 | 8/2013 | Choquet |
| 2013/0206740 A1 | 8/2013 | Pfeifer |
| 2013/0206741 A1 | 8/2013 | Pfeifer |
| 2013/0209976 A1 | 8/2013 | Postlethwaite |
| 2013/0230832 A1 | 9/2013 | Peters |
| 2013/0237336 A1 | 9/2013 | Cottam |
| 2013/0252214 A1 | 9/2013 | Choquet |
| 2013/0256289 A1 | 10/2013 | Knoener |
| 2013/0262000 A1 | 10/2013 | Hutchison |
| 2013/0264315 A1 | 10/2013 | Hung |
| 2013/0264322 A1 | 10/2013 | Bornemann |
| 2013/0265416 A1 | 10/2013 | Enyedy |
| 2013/0288211 A1 | 10/2013 | Patterson |
| 2013/0326842 A1 | 12/2013 | Pearson |
| 2014/0008088 A1 | 1/2014 | Chellew |
| 2014/0017642 A1 | 1/2014 | Postlethwaite |
| 2014/0042135 A1 | 2/2014 | Daniel |
| 2014/0042137 A1 | 2/2014 | Daniel |
| 2014/0069899 A1 | 3/2014 | Mehn |
| 2014/0131337 A1 | 5/2014 | Williams |
| 2014/0134579 A1 | 5/2014 | Becker |
| 2014/0134580 A1 | 5/2014 | Becker |
| 2014/0166631 A1 | 6/2014 | Rozmarynowski |
| 2014/0184496 A1 | 7/2014 | Gribetz |
| 2014/0220522 A1 | 8/2014 | Peters |
| 2014/0234813 A1 | 8/2014 | Peters |
| 2014/0263224 A1 | 9/2014 | Becker |
| 2014/0263227 A1 | 9/2014 | Daniel |

(56) References Cited

U.S. PATENT DOCUMENTS

| | | |
|---|---|---|
| 2014/0267773 A1 | 9/2014 | Jeung |
| 2014/0272835 A1 | 9/2014 | Becker |
| 2014/0272836 A1 | 9/2014 | Becker |
| 2014/0272837 A1 | 9/2014 | Becker |
| 2014/0272838 A1 | 9/2014 | Becker |
| 2014/0315167 A1 | 10/2014 | Kreindl |
| 2014/0322684 A1 | 10/2014 | Wallace |
| 2014/0346158 A1 | 11/2014 | Matthews |
| 2014/0346163 A1 | 11/2014 | Rajagopalan |
| 2014/0346793 A1 | 11/2014 | DeStories |
| 2014/0374396 A1 | 12/2014 | Luo |
| 2015/0056584 A1 | 2/2015 | Boulware |
| 2015/0056585 A1 | 2/2015 | Boulware |
| 2015/0072323 A1 | 3/2015 | Postlethwaite |
| 2015/0122781 A1 | 5/2015 | Albrecht |
| 2015/0154884 A1 | 6/2015 | Salsich |
| 2015/0170539 A1 | 6/2015 | Barrera |
| 2015/0190875 A1 | 7/2015 | Becker |
| 2015/0190876 A1 | 7/2015 | Becker |
| 2015/0190887 A1 | 7/2015 | Becker |
| 2015/0190888 A1 | 7/2015 | Becker |
| 2015/0194072 A1 | 7/2015 | Becker |
| 2015/0194073 A1 | 7/2015 | Becker |
| 2015/0209887 A1 | 7/2015 | DeLisio |
| 2015/0235565 A1 | 8/2015 | Postlethwaite |
| 2015/0248845 A1 | 9/2015 | Postlethwaite |
| 2015/0325153 A1 | 11/2015 | Albrecht |
| 2015/0328710 A1 | 11/2015 | Kachline |
| 2015/0352653 A1 | 12/2015 | Albrecht |
| 2015/0375323 A1 | 12/2015 | Becker |
| 2015/0375324 A1 | 12/2015 | Becker |
| 2015/0375327 A1 | 12/2015 | Becker |
| 2015/0379894 A1 | 12/2015 | Becker |
| 2016/0039034 A1 | 2/2016 | Becker |
| 2016/0039053 A1 | 2/2016 | Becker |
| 2016/0049085 A1 | 2/2016 | Beeson |
| 2016/0093233 A1 | 3/2016 | Boulware |
| 2016/0125592 A1 | 5/2016 | Becker |
| 2016/0125593 A1 | 5/2016 | Becker |
| 2016/0125594 A1 | 5/2016 | Becker |
| 2016/0125653 A1 | 5/2016 | Denis |
| 2016/0125761 A1 | 5/2016 | Becker |
| 2016/0125762 A1 | 5/2016 | Becker |
| 2016/0125763 A1 | 5/2016 | Becker |
| 2016/0125764 A1 | 5/2016 | Becker |
| 2016/0203734 A1 | 7/2016 | Boulware |
| 2016/0203735 A1 | 7/2016 | Boulware |
| 2016/0236303 A1 | 8/2016 | Matthews |
| 2016/0260261 A1 | 9/2016 | Hsu |
| 2016/0267806 A1 | 9/2016 | Hsu |
| 2016/0288236 A1 | 10/2016 | Becker |
| 2016/0358503 A1 | 12/2016 | Batzler |
| 2017/0046974 A1 | 2/2017 | Becker |
| 2017/0046975 A1 | 2/2017 | Becker |
| 2017/0046976 A1 | 2/2017 | Becker |
| 2017/0046977 A1 | 2/2017 | Becker |
| 2017/0148352 A1 | 5/2017 | Becker |
| 2017/0165776 A1 | 6/2017 | Becker |
| 2017/0169729 A1 | 6/2017 | Becker |

FOREIGN PATENT DOCUMENTS

| | | |
|---|---|---|
| CA | 2549553 | 7/2004 |
| CA | 2554498 | 4/2006 |
| CN | 1264822 | 8/2000 |
| CN | 100371672 | 12/2004 |
| CN | 1841321 | 10/2006 |
| CN | 1866317 | 11/2006 |
| CN | 1909020 | 2/2007 |
| CN | 101218060 | 7/2008 |
| CN | 201181527 | 1/2009 |
| CN | 101502906 | 8/2009 |
| CN | 101770710 | 7/2010 |
| CN | 102049595 | 5/2011 |
| CN | 102083580 | 6/2011 |
| CN | 102165504 | 8/2011 |
| CN | 102165505 | 8/2011 |
| CN | 102298858 | 12/2011 |
| CN | 202200202 | 4/2012 |
| CN | 102441737 | 5/2012 |
| CN | 103035135 | 4/2013 |
| CN | 103038804 | 4/2013 |
| CN | 202877704 | 4/2013 |
| CN | 103071909 | 5/2013 |
| CN | 103143810 | 6/2013 |
| CN | 103349558 | 10/2013 |
| CN | 103350268 | 10/2013 |
| CN | 103392089 | 11/2013 |
| CN | 203276641 | 11/2013 |
| CN | 103831553 | 6/2014 |
| CN | 203778997 | 8/2014 |
| DE | 202010011064 | 10/2010 |
| DE | 102010038902 | 2/2012 |
| EP | 0323277 | 7/1989 |
| EP | 0878263 | 11/1998 |
| EP | 0963744 | 12/1999 |
| EP | 1029306 | 8/2000 |
| EP | 1295195 | 6/2001 |
| EP | 1573699 | 9/2005 |
| EP | 1797545 | 6/2007 |
| EP | 1864744 | 12/2007 |
| EP | 2022592 | 2/2009 |
| EP | 2415560 | 2/2014 |
| EP | 3192481 | 7/2017 |
| ES | 2438440 | 1/2014 |
| FR | 1456780 | 7/1966 |
| FR | 2827066 | 1/2003 |
| GB | 2454232 A | 5/2009 |
| JP | H11146387 | 5/1999 |
| JP | 2000298427 | 10/2000 |
| JP | 2002317557 | 10/2002 |
| JP | 2004181493 | 7/2004 |
| JP | 2007021542 | 2/2007 |
| JP | 2009125790 | 6/2009 |
| KR | 100876425 | 12/2008 |
| KR | 20110000152 | 1/2011 |
| SU | 846203 | 7/1981 |
| SU | 972552 | 11/1982 |
| SU | 1324050 | 7/1987 |
| SU | 1354234 | 11/1987 |
| SU | 1489933 | 6/1989 |
| SU | 1638145 | 3/1991 |
| WO | 9958286 | 11/1999 |
| WO | 03019349 | 1/2003 |
| WO | 2004057554 | 7/2004 |
| WO | 2005102230 | 11/2005 |
| WO | 2005110658 | 11/2005 |
| WO | 2006004427 | 1/2006 |
| WO | 2006034571 | 4/2006 |
| WO | 2007009131 | 1/2007 |
| WO | 2007044135 | 4/2007 |
| WO | 2008076777 | 6/2008 |
| WO | 2009022443 | 2/2009 |
| WO | 2009053829 | 4/2009 |
| WO | 2009060231 | 5/2009 |
| WO | 2009092944 | 7/2009 |
| WO | 2009146359 | 12/2009 |
| WO | 2010000003 | 1/2010 |
| WO | 2010020867 | 2/2010 |
| WO | 2010020869 | 2/2010 |
| WO | 2010020870 | 2/2010 |
| WO | 2010111722 | 10/2010 |
| WO | 2011112493 | 9/2011 |
| WO | 2011150165 | 12/2011 |
| WO | 2012036710 | 3/2012 |
| WO | 2012137060 | 10/2012 |
| WO | 2013023012 | 2/2013 |
| WO | 2013061518 | 5/2013 |
| WO | 2013138831 | 9/2013 |
| WO | 2013186413 | 12/2013 |
| WO | 2014007830 | 1/2014 |
| WO | 2014074296 | 5/2014 |
| WO | 2014074297 | 5/2014 |
| WO | 2014140719 | 9/2014 |

(56) References Cited

FOREIGN PATENT DOCUMENTS

OTHER PUBLICATIONS

"Low Cost Virtual Reality Welding Training System," NSRP Joint Panel Meeting, Apr. 21, 2010, http://www.nsrp.org/6-Presentations/Joint/042110_Low_Cost_Virtual_Reality_Welder_Training_System_Fast.pdf.
"NJC Technology Displayed at ShipTech 2005", Welding Journal, vol. 84, No. 3, Mar. 2005, p. 54, https://app.aws.org/w/r/www/wj/2005/03/M1_2005_03.pdf.
"Sheet Metal Conference XXII," Conference Program, American Welding Society, May 2006, Detroit.
"Virtual Reality Program to Train Welders for Shipbuilding", American Welding Society, Navy Joining Center, https://app.aws.org/wj/2004/04/052/.
"Virtual Reality Welder Training Initiatives: Virtual Welding Lab Pilot," Paul D. Camp Community College, Advanced Science & Automation Corporation, Northrop Grumman Newport News, Nov. 22, 2006, http://www.nsrp.org/6-Presentations/WD/103106_Virtual_Reality_Welder.pdf.
"Virtual Welding—A Low Cost Virtual Reality Welder Training System", Interim Status Report # 4, Technology Investment Agreement 2008-600, Feb. 18, 2009, http://www.nsrp.org/3-Key_Deliverables/FY08_Low-Cost_Virtual_Reality_Welder_Trainer/ FY08_Low-Cost_Virtual_Reality_Welder_Trainer-Interim2.pdf.
"Virtual Welding: A Low Cost Virtual Reality Welder Training System," NSRP ASE, Feb. 19, 2009, http://www.nsrp.org/6-Presentations/WD/020409_Virtual_Welding_Wilbur.pdf.
"Vision for Welding Industry," American Welding Society, Apr. 22, 1999, http://www.aws.org/library/doclib/vision.pdf.
"Welding in Defense Industry," American Welding Society conference schedule, 2004. https://app.aws.org/conferences/defense/live_index.html.
"Welding Technology Roadmap," prepared by Energetics, Inc., Columbia, MD, in cooperation with The American Welding Society and the Edison Welding Institute, Sep. 2000.
123arc.com—"Weld into the future"; 2000.
Advance Program of American Welding Society Programs and Events, Nov. 11-14, 2007, Chicago.
Aiteanu, Dorin, and Axel Graser, "Computer-Aided Manual Welding Using an Augmented Reality Supervisor," Sheet Metal Welding Conference XII, Livoinia, MI, May 9-12, 2006, pp. 1-14.
Aiteanu, Dorin, et al., "A Step Forward in Manual Welding: Demonstration of Augmented Reality Helmet," Institute of Automation, University of Bremen, Germany, 2003.
Aiteanu et al., Generation and Rendering of a Virtual Welding Seam in an Augmented Reality Training Envionment, Proceedings of the Sixth IASTED International Conference Visualization, Imaging, and Image Proceeding, Aug. 28-30, 2006, Palma de Mallorca, Spain ISBN Hardcapy: 0-88986-598-1 /CD: 0-88986-600-7 (8 pages).
American Welding Society Forms: typical Procedure Qualification Record and Welding Procedure Specification forms.
American Welding Society's Virtual Welding Trailer to Debut at FABTECH Careers in Welding Trailer Appeals to New Generation of Welders, Miami, Florida, Nov. 3, 2011.
ArcSentry Weld Monitoring System, Version 3, Users Manual, Native American Technologies, Golden, CO, Dec. 10, 1999.
Arvika Forum Vorstellung Projeckt PAARA, BMW Group Virtual Reality Center, Nuernberg, 2003.
Ascension Technology Corporation: Tracking 3D Worlds: http://ascension-tech.com/, Dec. 1996.
Barckhoff, J.R.; "Total Welding Managemet," American Welding Society, 2005.
Bender Shipbuilding and Repair, Co., "Virtual Welding—A Low Cost Virtual Reality Welder Training System", Technical Proposal, Jan. 23, 2008.
Byrd, Alex Preston, "Identifying the effects of human factors and training methods on a weld training program" (2014). Graduate Theses and Dissertations. Paper 13991.
Central Welding Supply http://www.welders-direct.com/ Feb. 29, 2000.
Choquet, Claude, ARC+ & ARC PC Welding Simulators: Teach Welders with Virtual Interactive 3D Technologies; Jul. 2010.
Choquet, Claude, ARC+: Today's Virtual Reality Solution for Welders, Jun. 1, 2008.
Cybernetics: Enhancing Human Performance found in the DTIC Review dated Mar. 2001, p. 186/19. See http://www.dtic.mil/dtic/tr/fulltext/u2/a385219.pdf.
Echtler, Florian, Fabian Stuurm, Kay Kindermann, Gudrun Klinker, Joachim Stilla, Jorn Trilk, Hesam Najafi, "The Intelligent Welding Gun: Augmented Reality for Experimental Vehicle Construction," Virtual and Augmented Reality Applications in Manufacturing, Ong S.K and Nee A.Y.C., eds., Springer Verlag, 2003, pp. 1-27.
Evaluating Two Novel Tactile Feedback Devices, by Thomas Hulin, Phillipp Kremer, Robert Scheibe, Simon Schaetzle and Carsten Preusche presented at the 4th International Conference on Enactive Interfaces, Grenoble, France, Nov. 19-22, 2007.
Fast et al., Virtual Training for Welding, Proceedings of the Third IEEE and ACM International Symposium on Mixed and Augmented Reality (ISMAR 2004); 0-7695-2191-6/04; 2004.
Fast, Kenneth, Jerry Jones, and Valerie Rhoades; "Virtual Welding—A Low Cost Virtual Reality Welder Training System Phase II," National Shipbuilding Research Program (NSRP), NSRP ASE Technology Investment Agreement No. 2010-357, Feb. 29, 2012, http://www.nsrp.org/3-RA-Panel_Final_Reports/FY08_Virtual_Welder_Final_Report.pdf.
Fite-Georgel, Pierre; "Is there a Reality in Industrial Augmented Reality?" 10th IEEE International Symposium on Mixed and Augmented Reality (ISMAR), 2011.
Fridenfalk et al., Design and Validation of a Universal 6D Seam Tracking System in Robotic Welding Based on Laser Scanning, Industrial Robotics: Programming, Simulation, and Application, ISBN 3-86611-286-6, pp. 702, ARS/plV, Germany, Dec. 2006, edited by Kin Huat.
Fronius "The Ghost": http://www.fronius.com/cps/rde/xchg/SID-3202EAB7-AE082518/fronius_interational/hs.xs1/79_15490_ENG_HTML.htm; 2006.
Fronius International GmbH—Focus on Welding—Fronius Virtual Welding; http://www.fronius.com/cps/rde/xchg/SID-99869147-0110E322/fronius_intenational/hs.xsl/79_15490_ENG_HML.htm; 2006.
Fronius Perfect Welding; 06,3082, EN v01 2010 aw05; Virtual Welding—The training method of the future; Feb. 20, 2012.
ftp://www.hitl.washington.edu/pub/scivw/publications/IDS-pdf/HAPTIC1.pdf, (University of Washington): Table 11, Tactile Feedback Actuator Technologies, p. 119, below the table is a. Based on Hasser (1995, 1996).
GAWDA—Welding & Gases Today Online GAWDA Media Blog; Will Games Turn Welding into a Virtual Market? Friday, Dec. 2, 2011; http://www.weldingandgasestoday.org/blogs/Devin-OToole/index.php/ta . . . .
Gundersen, O., et al. "The Use of an Integrated Multiple Neural Network Structure for Simultaneous Prediction of Weld Shape, Mechanical Properties, and Distortion in 6063-T6 and 6082-T6 Aluminum Assemblies", Mathematical Modelling of Weld Phenomena, vol. 5, Maney Publishing, 2001.
Haptic Feedback for Virtual Reality by Grigore C. Burdea dated 1996.
Hemez, Francois M., Scott W. Doebling, "Uncertainty, Validation of Computer Models an the Myth of Numerical Predictability," Engineering Analysis Group (ESA-EA), Los Alamos National Laboratory, dated 2004.
Hillers, B, and Axel Graeser, "Direct welding arc observation withouth harsh flicker," FABTECH International and AWS Welding Show, 2007.
Hillers, B, and Axel Graeser, "Real time Arc-Welding Video Observation System," 62nd International Conference of IIW, Jul. 12-17, 2009, Singapore, 2009.
Hillers, B., et al.; "TEREBES: Welding Helmet with AR Capabilites," Institute of Automation, University of Bremen, and Institute of Industrial Engineering and Ergonomics, RWTH Aachen Universty, 2004.

(56) References Cited

OTHER PUBLICATIONS

Hillers, Bernd, Dorin Aiteanu, Axel Graser, "Augmented Reality—Helmet for the Manual Welding Process," Virtual and Augmented Reality Applications in Manufacturing, Institute of Automation, Universtity of Bremen, 2004.
Himperich, Frederick, "Applications in Augmented Reality in the Automotive Industry," Fachgebiet Augmented Reality, Department of Informatics, Jul. 4, 2007, p. 1-21.
http://www.123arc.com "Simulation and Certification"; 2000.
Image from SimWelder.com—R-V's Welder Training Goes Virtual, www.rvii.com/PDF/simwelder.pdf; Jan. 2010.
IMPACT Spring 2012 vol. 12, No. 2, Undergraduate Research in Information Technology Engineering, University of Virginia School of Engineering & Applied Science; 2012.
IMPACT Welding: miscellaneous examples from current and archived website, trade shows, etc. See, e.g., http://www.impactwelding.com.
Integrated Microelectromechanical Gyroscopes; Journal of Aerospace Engineering, Apr. 2003 pp. 65-75 (p. 65) by Huikai Xie and Garry K. Fedder.
International Search Report for PCT application No. PCT/US2009/045436, dated Nov. 9, 2009, 3 pgs.
International Search Report for PCT application No. PCT/US2012/050059, dated Nov. 27, 2012, 16 pgs.
International Search Report for PCT application No. PCT/US2013/038371, dated Jul. 31, 2013, 8 pgs.
International Search Report for PCT application No. PCT/US2013/066037, dated Mar. 11, 2014, 10 pgs.
International Search Report for PCT application No. PCT/US2013/066040, dated Mar. 11, 2014, 12 pgs.
International Search Report for PCT application No. PCT/US2014/018107, dated Jun. 2, 2014, 3 pgs.
International Search Report for PCT application No. PCT/US2014/018109, dated Jun. 2, 2014, 4 pgs.
International Search Report for PCT application No. PCT/US2014/018113, dated Jun. 2, 2014, 3pgs.
International Search Report for PCT application No. PCT/US2014/018114, dated Jun. 2, 2014, 4 pgs.
International Search Report for PCT application No. PCT/US2014/065498, dated May 11, 2015, 13 pgs.
International Search Report for PCT application No. PCT/US2014/065506, dated Jun. 26, 2015, 16 pgs.
International Search Report for PCT application No. PCT/US2014/065512, dated Jun. 8, 2015, 17 pgs.
International Search Report for PCT application No. PCT/US2014/065525, dated Jul. 23, 2015, 16 pgs.
International Search Report for PCT application No. PCT/US2014/067951, dated Feb. 24, 2015, 10 pgs.
International Search Report for PCT application No. PCT/US2015/037410, dated Nov. 6, 2015, 10 pgs.
International Search Report for PCT application No. PCT/US2015/037439, dated Nov. 3, 2015, 12 pgs.
International Search Report for PCT application No. PCT/US2015/037440, dated Nov. 3, 2015, 12 pgs.
International Search Report for PCT application No. PCT/US2015/039680, dated Sep. 23, 2015, 12 pgs.
International Search Report from PCT application No. PCT/US2015/043370, dated Dec. 4, 2015, 12 pgs.
International Search Report from PCT application No. PCT/US2015/058563, dated Jan. 29, 2016, 13 pgs.
International Search Report from PCT application No. PCT/US2015/058569, dated Feb. 10, 2016, 12 pgs.
International Search Report from PCT application No. PCT/US2015/058660, dated Feb. 2, 2016, 14 pgs.
International Search Report from PCT application No. PCT/US2015/058666, dated Feb. 1, 2016, 11 pgs.
International Search Report from PCT application No. PCT/US2015/058667, dated Feb. 5, 2016, 14 pgs.
Jo et al., Visualization of Virtual Weld Beads, VRST 2009, Kyoto, Japan, Nov. 18-20, 2009; Electronics and Telecommunications Research Institute (ETRI) ACM 978-1 60558-869-8/09, 0011.
Kiwinakiful; Holographic TV coming 2012 (as seen on BBV); http://www.youtube.com/watch?v=Ux6aD6vE9sk&feature=related, Jul. 2, 2011.
Kooima, Robert; Kinect +3D TV=Virtual Reality; http://www.youtube.com/watch?v=2MX1RinEXUM&feature=related, Feb. 26, 2011.
Leap Motion; https://www.leapmotion.com/, May 2012.
Lincoln Electric VRTEX Virtual Reality Arc Welding Trainer; http://www.lincolnelectric.com/en-us/equipment/training-equipment/pages/vrtex360.aspx; 1999.
MacCormick, John; How does the Kinect work?; http://users.dickinson.edu/~jmac/selected-talks/kinect.pdf, Dec. 1, 2011.
NAMeS Users Guide, N A Tech Neural Applications, Copyright 1997, 1998, 1999, 2000 Golden, CO (123 pages).
NAMeS, Native American Technologies Weld Measuring Software, Users Guide, 2000.
National Science Foundation—Where Discoveries Begin—Science and Engineering's Most Powerful Statements Are Not Made From Words Alone—Entry Details for NSF International Science & Engineering Visualization Challenge, Public Voting ended on Mar. 9, 2012; Velu the welder by Muralitharan Vengadasalam—Sep. 30, 2011; https://nsf-scivis.skild.com/skild2/NationalScienceFoundation/viewEntryDetail.action?pid . . . .
Native American Technologies, "ArcDirector Weld Controller" web page, http://web.archive.org/web/20020608125127/http://www.natech-inc.com/arcdirector/index.html, published Jun. 8, 2002.
Native American Technologies, "ArcSentry Weld Quality Monitoring System" web page, http://web.archive.org/web/20020608124903/http://www.natech-inc.com/arcsentry1/index.html, published Jun. 8, 2002.
Native American Technologies, "P/NA.3 Process Modelling and Optimization" web pages, http://web.archive.org/web/20020608125619/http://www.natech-inc.com/pna3/index.html, published Jun. 8, 2002.
Native American Technologies, "Process Improvement Products" web page, http://web.archive.org/web/20020608050736/http://www.natech-inc.com/products.html, published Jun. 8, 2002.
Natural Point, Trackir; http://www.naturalpoint.com/trackir/, Dec. 2003.
Numerical Simulation F Arc Welding Process and its Application Dissertation for Ohio State University by Min Hyun Cho, M.S. 2006: See Internet as this document is security protected) ohttps://etd.ohiolink.edu/ap:0:0:APPLICATION_PROCESS=DOWNLOAD_ETD_SUB_DOC_ACCNUM:::F1501_ID:osu11557411 attachment.
NZ Manufacturer Game promotes welding trade careers; http://nzmanufacturer.co.nz/2011/11/gme-promotes-welding-trade-careers/ . . . Compentenz Industry Training; www.competenz.org.nz; Game promotes welding trade careers, Nov. 7, 2011.
OptiTrack: Motion Capture Systems: http://www.naturalpoint.com/optitrack/, Mar. 2005.
Penrod, Matt; "New Welder Training Tools," EWI PowerPoint presentation, 2008.
PhaseSpace: Optical Motion Capture: http://phasespace.com/, 2009.
Playstation; Move Motion Controller: http://us.playstation.com/ps3/playstation-move/, Mar. 2010.
Polhemus: Innovation in Motion: http://polhemus.com/?page=researchandtechnology, 1992.
Porter et al, EWI-CRP Summary Report SR0512, Jul. 2005—Virtual Reality Welder Training.
Porter, Nancy C., Edison Welding Institute; J. Allan Cote, General Dynamics Electrict Boat; Timothy D. Gifford, VRSim; and Wim Lam, FCS Controls—Virtual Reality Welder Training—Project No. S1051 Navy Man Tech Program; Project Review for Ship Tech 2005,—Mar. 1, 2005, Biloxi, MS, http://www.nsrp.org/6-Presentations/WD/Virtual_Welder.pdf.
Porter, Nancy C., Edison Welding Institute; J.Allan Cote, General Dynamics Electric Boat; Timoty D. Gifford, VRSim; and Wim Lam, FCS Controls—Virtual Reality Welder Training—Session 5; Joining Technologies for Naval Applications; 2007.
Ryu, Jonghyun, Jaehoon Jung, Seojoon Kim, and Seungmoon Choi, "Perceptually Transparent Vibration Rendering Using a Vibration

(56) References Cited

OTHER PUBLICATIONS

Motor for Haptic Interaction," 16 IEEE International Conference on Robot & Human Interactive Communication, Jeju, Korea, Aug. 26-29, 2007.
Sandor, Christian, Gudrun Klinker, "PAARTI: Development of an Intelligent Welding Gun for BMW," PIA 2003, Tokyo, Japan, Technical University of Munich Department of Informatics, Oct. 7, 2003.
Sandor, Christian, Gudrun Klinker; "Lessons Learned in Designing Ubiquitous Augmented Reality User Interfaces," Emerging Technologies of Augmented Reality Interfaces, Eds. Haller, M, Billinghurst, M., and Thomas, B., Idea Group Inc., 2006.
ShotOfFuel; Wii Head Tracking for 3D, http://www.youtube.com/watch?v=1x5ffF-0Wr4, Mar. 19, 2008.
Stone, R. T., K. Watts, and P. Zhong, "Virtual Reality Integrated Welder Training, Welding Research," Welding Journal, vol. 90, Jul. 2011, pp. 136-s-141-s, https://app.aws.org/wj/supplement/wj201107_s136.pdf.
TCS News & Events: Press Release: TCS wins the "People Choice" award from National Science Foundation, USA, pp. 1-6; Press Release May 21, 2012; http://www.tsc.com/news_events/press_releases/Pages/TCS_People_Choice_award_Natio . . . .
TeachWELD: Welding Simulator/Hands-On Learning for Welding: http://realityworks.com/products/teachweld-welding-simulator; 2012.
Terebes; miscellaneous examples from http://www.terebes.uni-bremen.de.
The Rutgers Master II—New Design Force-Feedback Glove by Mourad Bouzit, Member, IEEE,Grigore Burdea, Senior Member, IEEE, George Popescu, Member, IEEE, and Rares Bolan, Student Member, found in IEEE/ASME Transactions on Mechatronics, vol. 7, No. 2, Jun. 2002.
Thefabricator.com—Arc Welding Article; Heston, Tim, Virtual welding—Training in a virtual environment gives welding students a leg up—Mar. 11, 2008.
Tschirner, Petra, Hillers, Bernd, and Graeser, Axel; "A Concept for the Application of Augmented Reality in Manual Gas Metal Arc Welding," Proceedings of the International Symposium on Mixed and Augmented Reality, 2002.
Vicon: Motion Capture Systems: http://vicon.com/, Dec. 1998.
Virtual Reality Training Manual Module 1—Training Overview—A Guide for Gas Metal Arc Welding—EWI 2006.
Welding Journal, American Welding Society, Nov. 2007, https://app.aws.org/wj/2007/11/WJ_2007_11.pdf.
White, S., et al., "Low-Cost Simulated MIG Welding for Advancement in Technical Training," Virtual Reality, 15, 1, 69-81, Mar. 2011. ISSN:13594338 [Retrieved from EBSCOhost, Jun. 15, 2015].
"SOLDAMATIC: Augmented Training Technology for Welding," Seabery Augmented Training Technology, Seabery Soluciones, 2011.
Hodgson, et al. "Virtual Reality in the Wild: A Self-Contained and Wearable Simulation System." IEEE Virtual Reality, Mar. 4-8, 2012, Orange County, CA USA.
Hashimoto, Nobuyoshi et al., "Training System for Manual Arc Welding by Using Mixed Reality: Reduction of Position-Perception Error of Electrode Tip," Journal of the Japan Society for Precision Engineering, vol. 72, pp. 249-253, 2006.
International Search Report from PCT application No. PCT/US2014/018103, dated Jun. 30, 2014, 13 pgs.
International Search Report from PCT application No. PCT/US2015/058567, dated May 6, 2016, 15 pgs.
International Search Report from PCT application No. PCT/US2015/058664, dated Apr. 25, 2016, 17 pgs.
International Search Report from PCT application No. PCT/US2016/023612, dated Jul. 18, 2016, 11 pgs.
Kobayashi, Kazuhiko et al., "Modified Training System for Manual Arc Welding by Using Mixed Reality and Investigation of Its Effectiveness," Journal of the Japan Society for Precision Engineering, vol. 70, pp. 941-945, 2004.
Kobayashi, Kazuhiko et al., "Simulator of Manual Metal Arc Welding with Haptic Display," Chiba University, ICAT 2001, Dec. 2001.
Kobayashi, Kazuhiko et al., "Skill Training System of Manual Arc Welding by Means of Face-Shield HMD and Virtual Electrode," Chiba University, Japan, R. Nakatsu et al. (eds.), Entertainment Computing, Springer Science+Business Media, New York, 2003.
VRTEX 360 Operator's Manual, Lincoln Electric, Oct. 2012.
VRTEX 360, Lincoln Electric, Dec. 2009.
Weld Training Solutions, REALWELD, The Lincoln Electric Company, Jul. 2015.
Quebec International, May 28, 2008 'Video Game' Technology to Fill Growing Need; http://www.mri.gouv.qc.ca/portail_scripts/actualities/viewnew.sap?NewID=5516.
Canadian Office Action Appln No. 2,961,806 dated Jan. 8, 2018 (3 pgs).
Canadian Office Action Appln No. 2,961,093 dated Mar. 5, 2018 (4 pgs).
Aiteanu, Dorin, "Virtual and Augmented Reality Supervisor for a New Welding Helmet" Nov. 15, 2005, pp. 1-150.
Wenbin Hou, "Discussion on Application of Simulation in Welding Teaching", Science and Technology Innovation, Nov. 30, 2011, p. 248.
K. Fast, et al., "Virtual Training for Welding", Third IEEE and ACM International Symposium on Mixed and Augmented Reality, Jan. 24, 2005, pp. 1-2.

* cited by examiner

SYSTEMS AND METHODS FOR A WELD TRAINING SYSTEM

RELATED APPLICATIONS

This application is a continuation of U.S. patent application Ser. No. 14/554,693, entitled "SYSTEMS AND METHODS FOR A WELD TRAINING SYSTEM," and claims priority from and the benefit of U.S. Provisional Patent Application Ser. No. 61/911,321, entitled "TRAINING SYSTEM USING A PORTABLE SMART DEVICE," filed Dec. 3, 2013. The entireties of U.S. patent application Ser. No. 14/554,693, and U.S. Provisional Patent Application Ser. No. 61/911,321 are incorporated herein by reference.

BACKGROUND

The present disclosure relates generally to welding systems, and more particularly, to a mobile device that may be used as a weld training tool for training and/or recruiting purposes.

Welding is a process that has increasingly become utilized in various industries and applications. Such processes may be automated in certain contexts, although a large number of applications continue to exist for manual welding operations. In both cases, such welding operations rely on a variety of types of equipment to ensure the supply of welding consumables (e.g., wire feed, shielding gas, etc.) is provided to the weld in appropriate amounts at the desired time.

In preparation for performing manual welding operations, welding operators may be trained using a weld training system. The weld training system may be designed to train welding operators with the proper techniques for performing various welding operations. Various training methods and systems may be utilized within the weld training systems. However, these training methods and systems are generally large and unwieldy, and may be too expensive to produce and utilize in higher volumes. Accordingly, it may be beneficial to provide for low cost weld training methods and systems that may be readily produced and utilized in higher volumes.

BRIEF DESCRIPTION

In an embodiment, weld training system is provided. The weld training system includes a welding torch configured to perform a welding procedure and a mobile device coupled to the welding torch. The mobile device is configured to detect, via one or more sensors, dynamic position or orientation information of the welding torch during the welding procedure to determine one or more operating parameters of the welding procedure. The mobile device is also configured to display a welding environment based at least in part on the one or more operating parameters.

In another embodiment, a weld training system is provided. The weld training system includes a welding torch configured to perform a simulated welding procedure on a simulated weld joint on an orientation device. The welding training system also includes a mobile device coupled to the welding torch. The mobile device includes a camera configured to detect one or more of a plurality of identifiers disposed on the orientation device. The mobile device also includes a processor configured to determine dynamic position or orientation information of the welding torch based at least in part on the one or more of the plurality of identifiers detected by the camera.

In another embodiment, a non-transitory computer-readable medium storing computer instructions is provided. The computer instructions are configured to perform, via a welding torch of a weld training system, a virtual welding procedure on a simulated weld joint with respect to an orientation device. The orientation device is a simulated work surface. The computer instructions are configured to receive, via one or more sensors disposed with a mobile device coupled to welding torch, dynamic position or orientation information of the welding torch. The computer instructions are configured to determine, via processing circuitry disposed within the mobile device, updated position or orientation information of the welding torch based at least in part on the received position or orientation information. The updated position or orientation information is utilized to determine one or more operating parameters of the virtual welding procedure.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
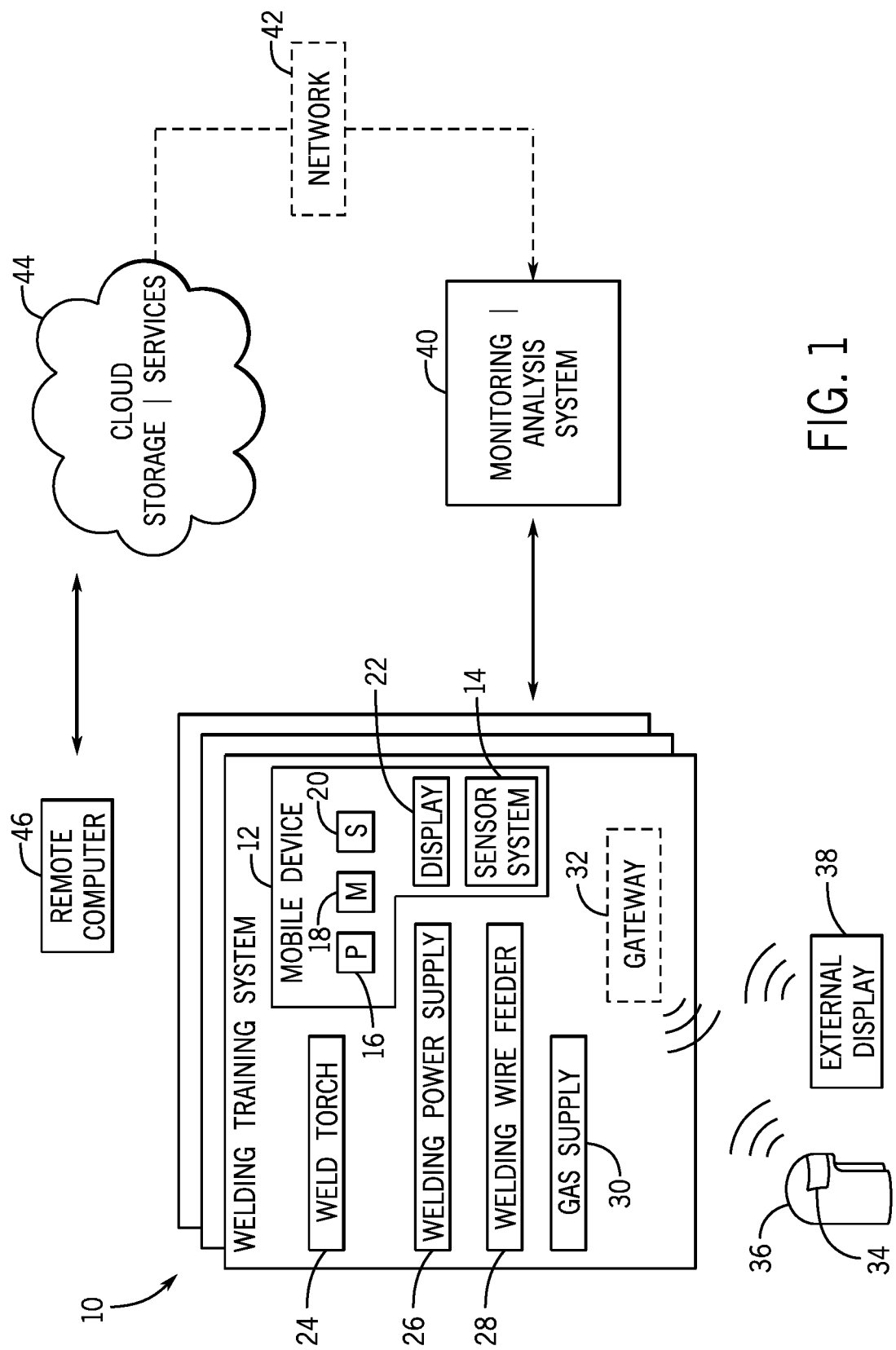
FIG. 1 is a block diagram of an embodiment of a weld training system utilizing a mobile device coupled to a welding torch, in accordance with aspects of the present disclosure.

Embodiments of the systems and methods described herein relate to a weld training system that utilizes a mobile device. In certain embodiments, the mobile device may be coupled to a welding torch of the weld training system, and an operator may engage the welding torch and the mobile device to perform a simulated welding experience for training or recruiting purposes. In particular, the mobile device may be configured to provide sensor feedback information related to the simulated welding experience to the weld training system and/or the operator. For example, one or more sensors disposed within the mobile device may be configured to detect position or orientation information of the welding torch during the simulated welding experience. Further, based on the position or orientation information detected, the mobile device may be configured to display a visual representation of a virtual welding environment on a display of the mobile device or on an external device. In addition, the mobile device may be configured to determine one or more operating parameters of the simulated weld during the simulated welding experience and, in certain embodiments, may display the one or more operating parameters on the display of the mobile device or the external device.

In certain embodiments, the welding torch and the mobile device may be configured to perform the simulated welding experience using an orientation device. For example, the orientation device may be a prefabricated two-dimensional or three-dimensional material having a series of identifiers (e.g., various patterns of dots, textures, raised surfaces, barcodes, QR codes, etc.) that orient the welding torch and guide the operator performing the simulated weld. In some situations, the orientation device may be configured for a particular type or a particular series of simulated welds. In certain embodiments, the mobile device may utilize one or more cameras or optical sensors to detect the identifiers on the orientation device to orient the welding torch while the particular type or series of simulated welds is performed relative to the orientation device.

In certain embodiments, the mobile device of the weld training system may be coupled to a welding torch performing an actual welding procedure (e.g., live welding arc, live-arc mode). In these situations, the weld training system may enable an augmented welding experience configured to enable training using augmented reality simulation. For example, the mobile device may be configured to provide a live video of the welding operator performing an augmented reality weld, live video of a welding arc, live video of a weld puddle, and/or simulated video of a welding operation. Furthermore, in certain embodiments, the mobile device may provide real-time feedback information on relevant process parameters of the augmented welding process that further guides the operator during the augmented welding experience.

In this manner, the operator may engage in a real-time simulated welding experience or a real-time augmented welding experience for training or recruiting purposes via a low cost weld training system. Specifically, the low cost weld training system described herein may be utilized and reproduced in higher volumes. It should be noted that the mobile device may also be configured to provide post-weld feedback providing a summary of the relevant process parameters of the simulated or augmented welding experience, including the operator's actions.

As used herein, the weld training system may include any suitable welding related system, including, but not limited to, a welding training system, a live welding system, a simulated welding system, a virtual reality welding system, a welding training application (e.g., utilized on a mobile device), a welding training system utilized on a gaming platform, and so forth. In certain embodiments, the weld training system may be configured to perform a virtual welding operation, a shielded metal arc welding (SAW) process, a gas-metal arc welding (GMAW) process, a tungsten inert gas (TIG) welding process, a plasma cutting process, or any other type of welding process.

FIG. 1 is a block diagram of an embodiment of a weld training system 10, in accordance with aspects of the present disclosure. As noted above, embodiments of the weld training system 10 include any suitable welding related system, including a welding application executed using the weld training system 10 that enables a simulated or an augmented welding experience. In certain embodiments, the weld training system 10 includes a mobile device 12, which may be any personal mobile device and/or portable mobile device. For example, the mobile device 12 may be a cellular phone (e.g., smart phone, iPhone®, Android® phone, Windows® phone, Blackberry®), a tablet computer, a laptop computer, a personal data assistant (PDA), and so forth. The mobile device 12 may have various sensors (e.g., accelerometers, gyroscopes, cameras, magnetometers, GPS) disposed within a sensor system 14 as described below, a memory to store data and instructions, and a processor configured to receive feedback from the sensors and to execute instructions for the mobile device 12. In some embodiments, the mobile device 12 includes a display screen configured to display information (e.g., graphical simulated welding experience, augmented welding experience, weld parameters) to the operator.

In particular, the illustrated embodiment depicts the mobile device 12 communicatively coupled to a welding torch 24. The mobile device 12 of the weld training system 10 includes one or more processors 16 (or any computing component), memory device(s) 18, storage device(s) 20, and a display 22. The processor(s) 16 may be used to execute software, such as welding software, a welding application, image processing software, sensing device software, and so forth. Moreover, the processor(s) 16 may include one or more microprocessors, such as one or more "general-purpose" microprocessors, one or more special-purpose microprocessors and/or application specific integrated circuits (ASICS), or some combination thereof. For example, the processor(s) 16 may include one or more reduced instruction set (RISC) processors.

The memory 18 may include a volatile memory, such as random access memory (RAM), and/or a nonvolatile memory, such as read-only memory (ROM). The memory device(s) 18 may store a variety of information and may be used for various purposes. For example, the memory device(s) 18 may store processor-executable instructions (e.g., firmware or software) for the processor(s) 16 to execute, such as instructions (e.g., application) for enabling a simulated or augmented welding experience via the mobile device 12 and/or instructions to communicate feedback information from/to the mobile device 12. In addition, a variety of control regimes for various welding processes, along with associated settings and parameters may be stored in the storage device(s) 20 and/or memory device(s) 18, along with code configured to provide a specific output (e.g., initiate wire feed, enable gas flow, capture welding current data, detect short circuit parameters, determine amount of spatter, etc.) during the simulated or augmented welding operation.

The storage device(s) 20 (e.g., nonvolatile storage) may include ROM, flash memory, a hard drive, or any other suitable optical, magnetic, or solid-state storage medium, or a combination thereof. The storage device(s) 20 may store data (e.g., data corresponding to a simulated or an augmented welding operation, video and/or parameter data corresponding to a simulated or augmented welding operation, etc.), instructions (e.g., software or firmware for the welding system, software for the welding application, software to enable communications and/or control with the mobile device 12, etc.), and any other suitable data. As will be appreciated, data that corresponds to the simulated or augmented welding operation may include a video recording of the welding operation, a simulated or augmented video, an orientation and/or a position of system 10 components, a work angle of the welding torch 24 with respect to a simulated or real workpiece, a travel angle of the welding torch 24 with respect to a simulated or real workpiece, a travel speed of the welding torch 24 with respect to a simulated or real workpiece, a distance between components of the system 10, a voltage, a current, a traversed path, a discontinuity analysis, welding device settings, and so forth.

As discussed above, the mobile device 12 comprises the display 22 configured for displaying data and/or screens associated with the simulated or augmented welding process (e.g., to display data generated by welding software), among other things. The display 22 may provide a graphical user interface to a welding operator (e.g., welding instructor, welding student, etc.). For example, the graphical user interface displayed by the display 22 may provide various screens to enable the operator (e.g., welding student, welding gamer, welding trainee, etc.) to perform the simulated or augmented welding task, view real-time feedback of the simulated or augmented welding parameters, view a post-welding summary of the simulated or augmented welding task, view averages and/or results from prior simulated or augmented welding tasks, compare and view final welding scores of one or more welding operators, and so forth. In certain embodiments, the display 22 may be a touch screen display configured to receive touch inputs, and to provide data corresponding to the touch inputs to the mobile device 12. In some embodiments, the display 22 is configured to display information corresponding to sensing device software, and provide a virtual and/or simulated image of the weld being performed, as further described below.

As noted above, the mobile device 12 may include a welding application disposed on the memory device(s) 18 and executed by the processor(s) 16. Further, an operator may engage the welding application via the display 22. For example, the welding application may allow an operator to select from various types or sequences of weld geometries, such as a T, fillet, butt, or other geometry, as well as the orientation of the weld (e.g., flat, horizontal, vertical, overhead). Based on the selected parameters of the simulated weld, the welding application may commence. In certain embodiments, after the operator engages a trigger on the welding torch 24 or the welding process is selected on the display 22, and as the welding torch 24 is moved, the sensor system 14 of the mobile device 12 may gather position and/or orientation information of the welding torch 24 as sensor feedback information. Based on the sensor feedback information, the display may graphically illustrate the welding torch 24 coming into position with respect to a simulated joint within a simulated welding environment.

In certain embodiments, the display 22 may display a menu where the operator 16 is able to specify settings such as the type of welding application, the mode of welding (e.g., simulated mode, live-arc mode, or augmented mode, among other modes), the weld joint geometry, the orientation, the material thickness, the wire feed speed, and the voltage. Another embodiment may permit the operator to pick the weld joint, orientation and material thickness, and the welding application of the mobile device 12 may suggest the wire feed speed and the voltage. The operator may then be able to adjust settings off of a starting point or accept these parameters. Based on travel speed, angles and orientation detected by the sensor system 14, the mobile device 12 may be configured to simulate the weld. As skill improves, the simulated weld by the operator will be at the desired location in the joint and the right width due to travel speed, angle, and orientation.

In certain embodiments, the mobile device 12 may utilize sensor feedback from the sensor system 14 to determine parameters like travel speed, wire location with respect to the joint, torch angles and contact tip or torch to joint/work distance. The processor 16 of the mobile device 12 may execute instructions (e.g., software) to utilize sensor feedback to simulate and display the simulated weld. The software may be available for use with the mobile device 12 through various sources, including, but not limited to, a tangible non-transitory storage media (e.g., flash drive, optical disc, magnetic disc), a network, a website (e.g., a manufacturer website, www.Millerwelds.com), and so forth. In some embodiments, scores and results from simulated welds performed by one or more operators may also be stored (e.g., in the memory 18) or shared.

In particular, the sensor system 14 of the mobile device 12 may include various sensors that sense the movement, position, and/or orientation of the mobile device 12 (and, by extension, the welding torch 24 to which the mobile device 12 is coupled) relative to a reference point or a reference object. For example, the mobile device 12 may have one or more 3D gyroscopes for angle information, one or more 3D accelerometers, one or more proximity sensors, one or more magnetometers, one or more GPS receivers, one or more Bluetooth sensors, other wireless field sensors, or any combination thereof. The mobile device 12 may utilize one or more of these sensors to sense a change in speed of the mobile device 12 in a direction and/or an orientation. Feedback (e.g., signals) from the one or more sensors may be stored in the memory 18 of the mobile device 12 for subsequent retrieval and/or transmission to another mobile device, a computer system, or a network, or any combination thereof. The processor 16 of the mobile device 12 utilizes feedback from the one or more sensors in real-time to simulate and display the simulated welding application on the display 22. In some embodiments, the mobile device 12 may utilize one or more of these sensors exclusively. In certain embodiments, the sensor system 14 of the mobile device includes one or more cameras or optical sensors. In certain embodiments, these cameras or optical sensors may be utilized to identify components within the environment that guide the simulated or augmented welding application, as further described with respect to FIG. 3.

In certain embodiments, one or more 3D accelerometers of the sensor system 14 of the mobile device 12 may generate signals based at least in part on acceleration of the mobile device 12 (and thereby the acceleration of the welding torch 24 coupled to the mobile device 12). The signals generated by the 3D accelerometers may be in units of G (e.g., approximately 9.81 m/s$^2$). The total acceleration of the mobile device 12 may be approximately equal to the gravitational acceleration (e.g., 1 G) plus the acceleration the user imparts to the mobile device 12. The mobile device 12 may separate the gravitational acceleration from user imparted acceleration utilizing signals from the one or more 3D gyroscopes that are from approximately the same time as the signals from the one or more 3D accelerometers.

Further, in certain embodiments, the sensor system 14 includes one or more 3D gyroscopes that may be utilized by the mobile device 12 to determine rotation of the mobile device 12 relative to one or more reference planes. In some embodiments, the one or more 3D gyroscopes may be utilized with the signals from the one or more 3D accelerometers to generate gyroscope enhanced motion data including, but not limited to, Euler angles of the mobile device 12 (e.g., pitch, roll, and yaw), attitude quaternion, rotation matrix, the gravitational component of 3D acceleration, a user acceleration component of 3D acceleration, or rotation rate, or any combination thereof. In some embodiments, the Euler angles of the mobile device 12 determined by the one or more 3D gyroscopes may be in units of radians or degrees.

Further, in certain embodiments, the sensor system 14 may include one or more global positioning system (GPS) receivers configured to report location data of the mobile device 12. Location data includes, but is not limited to, latitude and longitude, magnetic heading relative to magnetic north, true heading relative to true north, course and speed of movement, or altitude, or any combination thereof. As may be appreciated, latitude and longitude may be geographical coordinates using the World Geodetic System (WGS) 84 reference frame. Course data may represent the direction in which the mobile device 12 and/or the welding torch 14 are traveling in units of degrees. Course values are measured in degrees starting at due north and continuing clockwise around the compass. For example, north is 0 degrees, east is 90 degrees, south is 180 degrees, and west is 270 degrees. Speed data may represent the instantaneous speed of the mobile device 12 and/or the welding torch 14, such as in meters per second. This value represents the instantaneous speed of the mobile device 12 and/or the welding torch 14 in the direction of its current heading. The one or more magnetometers may provide compass direction for the mobile device 12 and/or the welding torch 14, such as in units of microteslas.

In certain embodiments, the display 22 may depict the simulated welding environment based on the sensor feedback received from the sensor system 14. For example, the display 22 may darken to display sparks, the arc, and a glowing weld deposit as a simulation of the weld as feedback of technique. A start switch or a trigger on the welding torch 24 or other device such as foot pedal or finger control may be in communication with the mobile device 12. Additionally, or in the alternative, the simulated welding application may be started by touching a start icon on the display 22. Accordingly, after the operator commences the simulated weld, the display 22 may darken to depict the simulated welding experience and environment, and the operator may move the display 22 of the mobile device 12 via the welding torch 24 and watch the simulated formation of the weld for the length of the simulated welding application.

In certain embodiments, instead of a simulated welding environment wherein the entirety of the simulated weld is generated by the simulated welding application, an augmented welding environment wherein live video of a live arc is augmented with other video and/or information may be displayed via the display 22 of the mobile device 12. In such embodiments, the display 22 may depict the augmented welding environment based on the sensor feedback received from the sensor system 14. For example, if an operator selects an augmented welding mode from the display 22, the mobile device 12 may be configured for an augmented reality simulation. As part of this augmented reality simulation, the mobile device 12 may receive and display a live video of a welding operator performing a real weld with a live arc. Further, based on the sensor feedback received from the sensor system 14, the mobile device 12 may integrate a virtual welding environment into the live video of the real welding application. In this manner, the display 22 may generally be transparent to enable the welding operator to view actual objects within the real welding environment; however, a virtual welding environment may be portrayed on portions of the display 22 to also enable the welding operator to view virtual objects superimposed on the actual (i.e., real world) objects captured in the live video. The virtual objects may be any number of figures, symbols, text, or images that may guide the welding operator during the actual welding process.

In certain embodiments, components of the weld training system 10 may be used by the operator (e.g., welding student, trainee, gamer, recruiter, trainer, etc.) to perform simulated or augmented welding operations that provide the user with a simulated or augmented welding like experience. For example, the weld training system 10 may include the welding torch 24 (either as a live-arc torch or dummy torch), a welding power supply 24 (that supplies the welding power during live-arc welding), a welding wire feeder 28 (that supplies welding wire during live-arc welding in certain embodiments), a gas supply 30 (that supplied shielding gas during live-arc welding in certain embodiments), or any combination thereof. It should be noted that in some embodiments, the weld training system 10 may include a gateway 32 to facilitate communication between various components of the weld training system 10. For example, the mobile device 12 may be in wireless communication with the gateway 32 of the weld training system 10, and the gateway 32 may receive and communicate information (e.g., sensor feedback information related to the simulated or augmented welding operation, the simulated or augmented welding parameters, the post-welding summary of the simulated or augmented welding task, etc.) to external components of the welding training system 10, such as a display 34 on a welding helmet 36 or an external display 38. In some embodiments, the welding training system 10 may be coupled via a wired or wireless (e.g., Bluetooth, Wi-Fi, etc.) connection to the welding helmet 36 and/or the external display 38, and may project feedback into the welding helmet 36. In certain embodiments, the external display 38 may be an augmented reality display, which may include optical projection systems, monitors, hand held devices, head-mounted displays, eyeglasses (e.g., glasses that are configured to augment a portion of a person's field of view), etc. Angles, coaching, voice, and other information may be useful for feedback when running the system with the welding helmet 36 on to more closely simulate welding without the helmet darkening.

Further, in certain embodiments, one or more weld training systems 10 may be coupled to a monitoring/analysis system 40. The monitoring/analysis system 40 may gather information from the one or more weld training systems 10, and the monitoring/analysis system 40 may be configured to work off-line or on a network 42 (e.g., Wi-Fi network). The network 42 may communicatively couple the monitoring/analysis system 40 to the cloud storage/services 44. The cloud storage/services 44 may contain information that provide feedback or aid to an instructor or operator performing a welding process. The weld training system 10 also may provide haptic vibration and/or audible feedback to the operator utilizing a database of information for proper technique, travel speed, and distance, among other training variables. The haptic vibration and/or audible feedback may be provided based at least in part on a history of one or more simulated or augmented welds performed by the operator. The cloud storage/services 44 may be coupled to a remote computer 46 that provides or retrieves information from or to the cloud 44.

It should be noted that while aspects of the present embodiments are generally described in the context of weld training systems, features of the present embodiments may be utilized in other types of welding systems, such as those described above.

Figure 2:
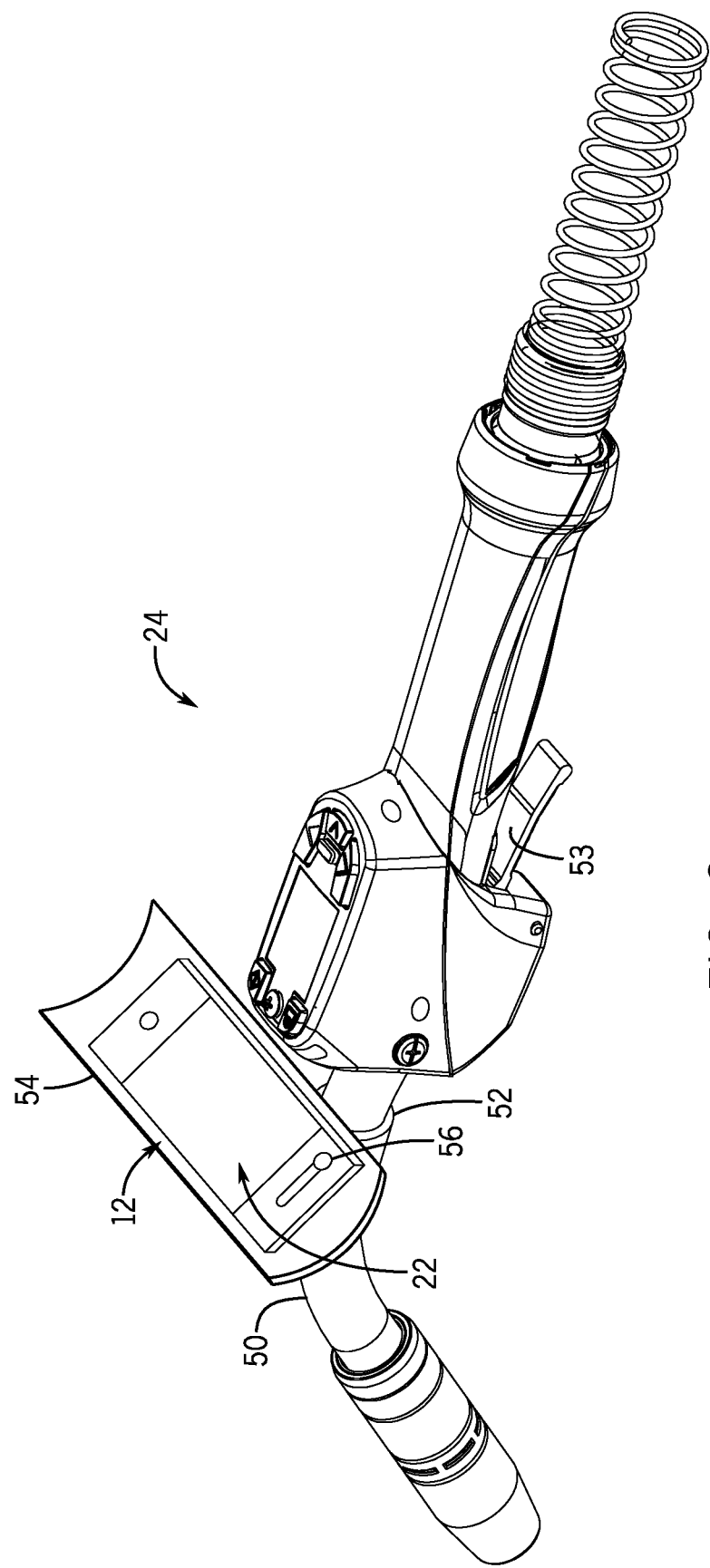
FIG. 2 is an embodiment of the mobile device coupled to the welding torch of FIG. 1, in accordance with aspects of the present disclosure.

FIG. 2 is an embodiment of the mobile device 12 coupled to a neck 50 of the welding torch 24 of FIG. 1, in accordance with aspects of the present disclosure. The mobile device 12 may be fixedly or removably mounted on the welding torch 24, such as on the neck 50 of the welding torch 24, via one or more mounting devices 52. It will be appreciated that while illustrated as being coupled to the neck 50 of the welding torch 24, in other embodiments, the one or more mounting devices 52 may be configured to be coupled to other places (e.g., a handle) of the welding torch 24. In the illustrated embodiment, the operator may move either the welding torch 24 or the mobile device 12 in order to engage both the welding torch 24 and the mobile device 12 for the simulated or augmented welding process. In particular, the display 22 of the mobile device 12 may be positioned on the neck 50 such that it generally guides the operator's eyes to look at the welding torch 24 in a desired manner while welding. In certain embodiments, the one or more mounting devices 52 may be moveable with respect to the welding torch 24 in order to allow the operator to slightly move, rotate, tilt, or adjust the position of the mobile device 12 for comfort or ease of operation. In addition, in certain embodiments, the one or more mounting devices 50 may be configured to be removably coupled to the welding torch 24 at their appropriate positions with respect to the welding torch 24 such that, for example, the one or more mounting devices 50 may be removed when the welding torch 24 is not being used for weld training.

As illustrated in FIG. 2, in certain embodiments, the mounting device 52 may include, or be directly coupled to, a shield 54 that is configured to hold the mobile device 22 in place with respect to the welding torch 24 while also protecting the mobile device 12 from welding materials (e.g., spatter) during an actual welding process. In certain embodiments, the shield 54 may be transparent, such that the mobile device 12 (and/or the operator) is not restricted in its field of view during operation. For example, the mobile device 12 may be able to gather information or data (e.g., via a camera that is disposed proximate the shield 54 when the mobile device 122 is held in place by the shield 54) through the transparent shield 54 during the simulated or augmented welding process. Further, the welding torch 24 may include a trigger 53. As described above, the start of the simulated or augmented weld may be initiated via the touch screen display 22 on the mobile device 12, or by depression of the trigger 53 of the welding torch 24, or a combination thereof. In some embodiments, additional triggers or switches may be disposed on the welding torch 24 or on a foot pedal. The triggers and/or switches may communicate via wired or wireless (e.g., Wi-Fi, Bluetooth) connections to initiate start. For example, the operator may engage the trigger 53 on the welding torch 24 to commence a simulated or augmented welding process. In certain embodiments, the mobile device 12 may sense the actuation or release of the trigger 53 through a wired connection through the mounting device 52.

In certain embodiments, the mobile device 12 includes a camera 56 (or other optical sensor) that may be a component of the sensor system 14. In certain embodiments, the camera 56 may be utilized to provide a live video of the actual live arc during an augmented welding process. For example, as noted above, in certain embodiments, the shield 54 may be transparent, and the camera 56 of the mobile device 12 may be configured to gather information or data through the transparent shield 54. Alternatively, or in addition to, in certain embodiments, the camera 56 may be configured to gather information or data through the one or more apertures disposed on the shield 54. In certain embodiments, the camera 56 may be utilized to detect one or more orientation devices 58 during a simulated welding process, as further described with respect to FIG. 3. Although the camera 56 illustrated in FIG. 2 appears to be on a side of the mobile device 12 opposite from an operational end of the welding torch 24 when held in place by the mounting device 52, it will be appreciated that the camera 56 of the mobile device 12 may be functional on both sides of the mobile device 12 such that the camera 56 is capable of collecting video and image data from the operational area around a workpiece (or an orientation device 58) during a live arc welding operation or a simulated or virtual welding operation.

Figure 3:
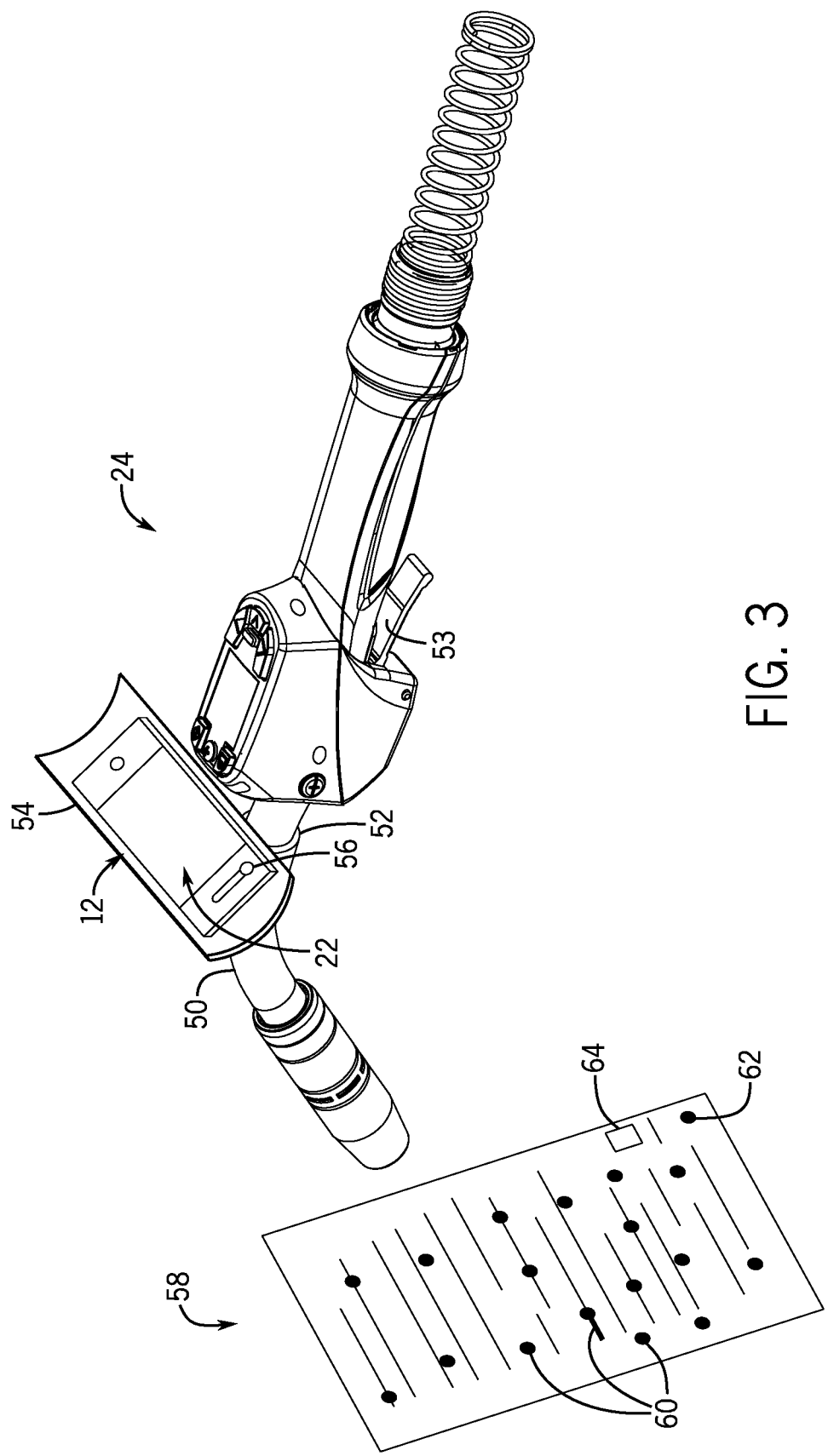
FIG. 3 is an embodiment of the mobile device coupled to the welding torch of FIG. 1, where the mobile device is utilized with an orientation device, in accordance with aspects of the present disclosure.

FIG. 3 is an embodiment of the mobile device 12 coupled to the welding torch 24 of FIG. 1, where the mobile device 12 is utilized with an orientation device 58, in accordance with aspects of the present disclosure. The orientation device 58 may be a prefabricated two-dimensional or three-dimensional material having a series of identifiers 60 (e.g., various patterns of dots, lines, curves, grids, recesses, protrusions, geometric shapes, textures, raised surfaces, barcodes, QR codes, etc.). In certain embodiments, the orientation device 58 may be a separate token, a piece of paper, a sheet of plastic, a solid surface, a tag, or the like. The orientation device 58 may be utilized for a simulated welding process, and may be configured to orient the welding torch 24 and guide the operator performing the simulated weld. For example, the orientation device 58 may be a simulated work surface on which the operator may perform a simulated weld joint for a virtual or simulated welding application.

In some embodiments, the sensor system 14 of the mobile device 12 may utilize the camera 56 to detect the identifiers 60 on the orientation device 58. For example, the camera 56 may detect a series of patterns of identifiers 60 that aid the mobile device 12 in determining where the mobile device 12 is positioned relative to a starting point 62 on the orientation device 58, a travel speed of the mobile device 12 (and, by extension, the welding torch 24) relative to the orientation device 58, additional angle information of the mobile device 12 (and, by extension, the welding torch 24) relative to the orientation device 58, and distance of the mobile device 12 (and, by extension, the welding torch 24) to the orientation device 58 for the weld simulation. In some embodiments, the camera 56 may work exclusively without other sensors of the sensor system 14 to provide feedback to the mobile device 12. In other embodiments, the mobile device 12 may utilize the camera 56 and one or more of sensors including, but not limited to one or more 3D accelerometers, one or more proximity sensors, one or more magnetometers, one or more GPS receivers, one or more Bluetooth sensors, other wireless field sensors, or any combination thereof. For example, the camera 56 may determine a position and/or orientation of the mobile device 12 (and, by extension, the welding torch 24) relative to the orientation device 58, and the other sensors may be used to confirm and/or slightly adjust the determined position and/or orientation. In some embodiments, the mobile device 12 may sense (e.g., via a magnetometer) small magnets 64 disposed on the orientation device 58 to determine speed, direction, orientation, and other feedback parameters for the simulated welding process.

In particular, the camera 56 may detect the patterns of the identifiers 60 on the orientation device 58. The identifiers 60 may be unique (e.g., color, geometry, etc.) and disposed in various locations on the orientation device 58 to enable accurate position and/or orientation information for the system 10 (e.g., mobile device 12, welding torch 24, and so forth) relative to the orientation device 58. This unique pattern enables the mobile device 12 to determine parameters of the simulated weld, such as a travel distance, a weld width, a depth, one or more angles, or any combination thereof. The camera 56 may detect the identifiers 60, and may provide this information to the processor 16 of the mobile device 12. The processor 16 may be configured to extract information from the identifiers 60 that orient the welding torch 24 with respect to the simulated weld simulated on the orientation device 58. In turn, the orientation device 58 may guide the operator through the simulated weld. In certain embodiments, the operator may dynamically adjust one or more operating parameters of the simulated welding process based on the detected identifiers (i.e., based on the position or orientation of the welding torch 24 with respect to the simulated weld).

In some embodiments, the one or more sensors in the mobile device 12 are used to help ensure accuracy of the measurements determined via the camera 56. In other embodiments the camera 56 may be used without the identifiers 60 and/or the orientation device 58. That is, the camera 56 may determine the relative movement and/or the relative orientation of the mobile device 12 via utilizing one or more objects in the field of view of the camera 56 as orientation devices. In such situations, the orientation device 58 may not be needed.

In some embodiments, the mobile device 12 may be mounted to a welding torch 24 during an actual welding application to provide angle, position, travel speed, and other sensor information, which may be attributed to the welding torch 24. In other words, when mounted to the welding torch 24, the mobile device 12 may serve similar functionality as a retrofit kit for adding the camera 56, sensors, display 22, processor 16, memory 18, and storage 20 of the mobile device 12 to the welding torch 24, thereby enabling the welding torch 24 to function as a mobile weld training system 10. Further, in such situations, the mobile device 12 and the welding torch 24 may also be configured for an augmented welding application. In certain augmented welding applications, the mobile device 12 may be placed in various areas on the operators hand and/or welding torch 24 to provide feedback without blocking the actual welding process. The camera 56 may also use various filtering means to help track the weld and even display a live feed of the actual weld occurring.

In certain embodiments, the portable weld training system 10 can incorporate a competitive, gaming aspect to the simulated welding experience provided by the mobile device 12, and can provide a welding score to the user based on the received feedback. Further, the mobile device 12 may access the storage within the network 42 or cloud 44 to store and/or retrieve information for each welding operator, such as, for example, user identification information, historical weld information, and/or historical welding scores.

Figure 4:
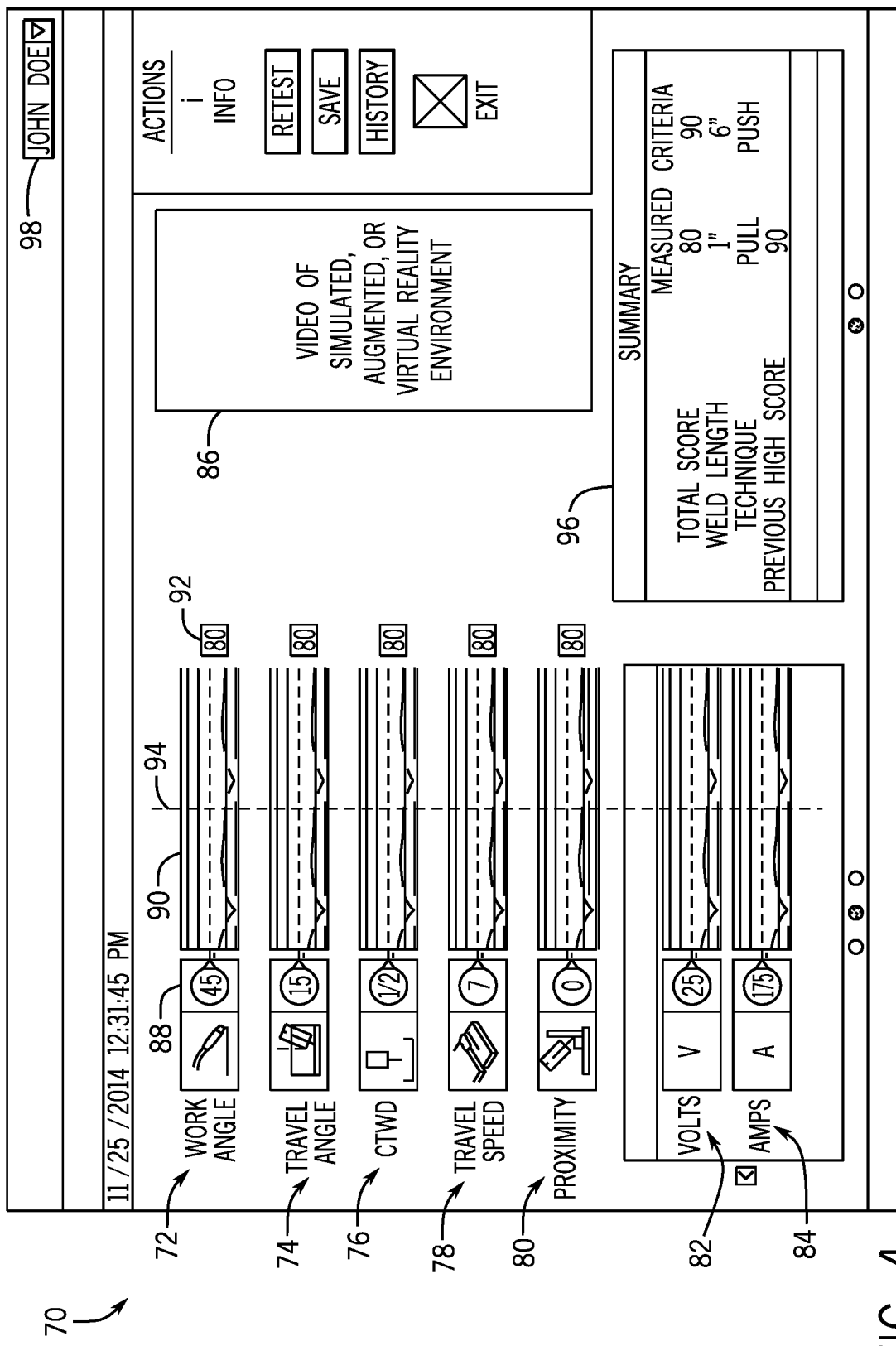
FIG. 4 is an embodiment of a screen illustrating data corresponding to a simulated, augmented, or virtual reality welding environment, in accordance with aspects of the present disclosure.

FIG. 4 is an embodiment of a screen 70 illustrating data corresponding to a simulated, augmented, or virtual reality welding environment, such as those generated by the weld training system 10, in accordance with aspects of the present disclosure. The screen 70 may be produced by the weld training software disposed on the mobile device 12, and may be displayed on the display 22, the external display 38, and/or the helmet 36. The screen 70 illustrates parameters that may be graphically displayed to a welding operator before, during, and/or after performing a simulated, augmented, or virtual reality welding operation. For example, the parameters may include a work angle 72, a travel angle 74, a contact tip to work piece distance 76 (e.g., CTWD 76), a welding torch travel speed 78, a proximity of the welding torch 24 in relation to a work piece 80, a welding voltage 82, a welding current 84, a welding torch orientation, a welding torch position, an aim of the welding torch 24, a video replay of the simulation, augmented, or virtual reality welding environment 86, and so forth.

As illustrated, graphically illustrated parameters may include an indication 88 of a current value of a parameter (e.g., while performing a weld training assignment). Furthermore, a graph 90 may show a history of the value of the parameter, and a score 92 may show an overall percentage that corresponds to how much time during the weld training assignment that the welding operator was within a range of acceptable values. As noted above, a video replay 86 of a weld training assignment may be provided on the screen 70. The video replay 86 may show live video of a welding operator performing the simulated or actual weld with either a simulated, augmented, or virtual reality environment superimposed thereon.

In some embodiments, a time 94 during a weld may be selected by a welding operator. By selecting the time 94, the welding operator may view the video replay 86 in conjunction with the welding parameters as they were at the selected time 94 in order to establish a correlation between the welding parameters and the video replay 86. The weld training software may be configured to recreate welding data based at least partly on welding parameter data, to synchronize the video replay 86 with the recreated welding data, and to provide the synchronized video replay 86 and recreated welding data to the display 22, the external display 38, and/or the helmet 36. Further, in some embodiments, a summary of the post-welding data and/or score may be displayed on a summary page 96 for each welding operator 98. It should be noted that in some situations, the screen 70 may display a comparison of total scores for each welding individual 98. Indeed, the weld training system may include or utilize any number of weld training features (e.g., a total welding score) or techniques (e.g., comparing weld training information) previously disclosed in U.S. Patent Application Publication No. 2014/0272837, entitled "MULTI-MODE SOFTWARE AND METHOD FOR A WELDING TRAINING SYSTEM," filed Mar. 15, 2013, which is hereby incorporated by reference in its entirety for all purposes.

While only certain features of the present embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A weld training system, comprising:
 a mobile device configured to be attached to a welding accessory using a mount, the mobile device comprising one or more sensors, wherein the mobile device is configured to:
  gather, via the one or more sensors of the mobile device, information indicative of dynamic position or orientation of the mobile device during a welding procedure; and
  display, via a display of the mobile device, a welding environment based on the information.

2. The weld training system of claim 1, further comprising a welding torch, the mobile device configured to be communicatively coupled to a welding torch.

3. The weld training system of claim 2, wherein the welding torch is configured to perform a simulated welding procedure on a simulated weld joint on a simulated work surface, and wherein the mobile device is configured to display a simulated welding environment based at least in part on the information.

4. The weld training system of claim 2, wherein the welding torch is configured to perform an actual welding procedure on an actual weld joint with a live arc, and wherein the mobile device is configured to display an augmented welding environment based at least in part on the information.

5. The weld training system of claim 4, wherein the display of the augmented welding environment comprises a live video of actual objects used in the actual welding procedure with one or more virtual objects superimposed on the actual objects.

6. The weld training system of claim 2, wherein the mobile device is configured to receive an indication of actuation or release of a trigger, and to perform a welding simulation in response to detecting the indication of actuation of the trigger.

7. The weld training system of claim 2, wherein the welding torch is configured to perform a simulated welding procedure on a simulated weld joint on a simulated work surface, and wherein the mobile device is configured to display the welding environment as an augmented welding environment.

8. The weld training system of claim 7, wherein the mobile device is configured to display the augmented welding environment as a live video of actual objects used in the actual welding procedure with one or more virtual objects superimposed on the actual objects, the one or more virtual objects comprising at least one of the simulated weld joint or the simulated work surface.

9. The weld training system of claim 1, wherein the weld training system is configured to provide at least one of haptic vibration or audio feedback.

10. The weld training system of claim 1, wherein the one or more sensors comprise a camera.

11. The weld training system of claim 10, wherein the camera is configured to detect an orientation device, the mobile device configured to determine the information based on an image of the orientation device captured by the camera.

12. The weld training system of claim 10, wherein the one or more sensors further include at least one of an accelerometer, a gyroscope, a proximity sensor, a magnetometer, a GPS receiver, or an electromagnetic field sensor, the mobile device configured to determine the information based on a combination of an image captured by the camera and the at least one of the accelerometer, the gyroscope, the proximity sensor, the magnetometer, the GPS receiver, or the electromagnetic field sensor.

13. The weld training system of claim 1, wherein the mobile device is configured to display the simulated welding environment by displaying an entirety of a simulated weld generated by a simulated welding application, including the simulated weld joint, a simulated work surface, and live video of actual objects used in the actual welding procedure with one or more virtual objects superimposed on the actual objects, the one or more virtual objects comprising at least one of the simulated weld joint or the simulated work surface.

14. The weld training system of claim 1, wherein the mobile device is configured to determine an operating parameter based on the information, the operating parameter comprising at least one of: a work angle of a welding torch, a travel angle of the welding torch, a travel speed of the welding torch, a contact tip to work piece distance, a proximity of the welding torch to a weld joint, a welding voltage, a welding current, an orientation of the welding torch, or a position of the welding torch.

15. The weld training system of claim 1, further comprising an orientation device comprising an identifier, wherein a sensor of the mobile device is configured to detect the identifier.

16. The weld training system of claim 15, wherein the mobile device is configured to determine a first position of the mobile device based at least on the detection of the identifier, and wherein the mobile device is configured to determine a second position of the welding torch relative to the orientation device based at least in part on the determined first position of the mobile device and the mounted position.

17. The weld training system of claim 15, wherein the identifier comprises at least one of patterns, dots, lines, curves, grids, recesses, protrusions, geometric shapes, textures, raised surfaces, barcodes, or QR codes.

18. The weld training system of claim 1, wherein the mobile device is configured to implement a gaming application based on the information and the welding procedure.

19. The weld training system of claim 1, wherein the mobile device comprises a storage device and is configured to store at least one of user identification information based on the information, historical weld information based on the information, or historical welding scores based on the information.

20. The weld training system of claim 1, wherein the mobile device is configured to transmit the information to an external device.

21. The weld training system of claim 20, wherein the external device is a device selected from the group consisting of: an external display, a remote computing system, or cloud storage or processing.

22. The weld training system of claim 1, wherein the mobile device is configured to display the welding environment as an augmented welding environment including a live video of actual objects used in the actual welding procedure with one or more virtual objects superimposed on the actual objects, the one or more virtual objects comprising at least one of the simulated weld joint or the simulated work surface.

* * * * *